(12) United States Patent
Leung et al.

(10) Patent No.: US 10,487,212 B2
(45) Date of Patent: Nov. 26, 2019

(54) THERMALLY STABLE COLOR PIGMENTS WITH NANOFIBER COATING

(71) Applicant: Hong Kong Baptist University, Hong Kong (HK)

(72) Inventors: Cham Fai Leung, Hong Kong (HK); Chung Yan Yick, Hong Kong (HK)

(73) Assignee: Hong Kong Baptist University, Hong Kong (HK)

( * ) Notice: Subject to any disclaimer, the term of this patent is extended or adjusted under 35 U.S.C. 154(b) by 114 days.

(21) Appl. No.: 15/813,172

(22) Filed: Nov. 15, 2017

(65) Prior Publication Data

US 2018/0223105 A1    Aug. 9, 2018

Related U.S. Application Data

(60) Provisional application No. 62/455,065, filed on Feb. 6, 2017.

(51) Int. Cl.
| | | |
|---|---|---|
| *C09C 1/24* | (2006.01) | |
| *C09C 3/06* | (2006.01) | |
| *C09C 3/04* | (2006.01) | |
| *C01F 7/02* | (2006.01) | |
| *C01B 33/113* | (2006.01) | |
| *B82Y 40/00* | (2011.01) | |
| *B82Y 30/00* | (2011.01) | |

(52) U.S. Cl.
CPC .............. *C09C 1/24* (2013.01); *C01B 33/113* (2013.01); *C01F 7/02* (2013.01); *C09C 3/04* (2013.01); *C09C 3/063* (2013.01); *B82Y 30/00* (2013.01); *B82Y 40/00* (2013.01); *C01P 2004/24* (2013.01)

(58) Field of Classification Search
CPC ......... C09C 1/24; C09C 1/245; C09C 1/3661; C09C 3/04; C09C 3/06; C09C 3/063; C01B 33/113; C01F 7/02; B82Y 30/00; B82Y 40/00; C01P 2002/85; C01P 2002/88; C01P 2004/24; C01P 2006/60; C01P 2006/62; C01P 2006/63; C01P 2006/64

See application file for complete search history.

(56) References Cited

U.S. PATENT DOCUMENTS

| | | | |
|---|---|---|---|
| 3,969,494 A | 7/1976 | Nobuoka et al. | |
| 4,053,325 A | 10/1977 | Vanderheiden | |
| 4,289,745 A * | 9/1981 | Patil ....................... | B82Y 30/00 106/452 |
| 4,291,010 A | 9/1981 | Senda et al. | |
| 4,374,676 A | 2/1983 | Senda et al. | |
| 4,374,677 A | 2/1983 | Senda et al. | |
| 4,376,656 A | 3/1983 | Senda et al. | |
| 4,734,136 A | 3/1988 | Burow | |
| 6,027,559 A | 2/2000 | Morii et al. | |
| 2001/0011110 A1* | 8/2001 | Hayashi ................. | B82Y 30/00 523/212 |
| 2016/0000801 A1* | 1/2016 | Akagi .................. | A61K 9/0095 514/213.01 |

* cited by examiner

*Primary Examiner* — Pegah Parvini

(74) *Attorney, Agent, or Firm* — Idea Intellectual Limited; Margaret A. Burke; Sam T. Yip

(57) ABSTRACT

A method to coat oxide-based color pigments with an ultrasound-assisted coating of nanofiber or other nanostructures in order to enhance heat-fastness and color performance to said color pigments is presented. In particular, the present invention provides a method to coat oxide-based color pigments with nano-coating materials, including but not limited to, alumina and/or silica at different dosage levels, with nanospike, nanoneedle, nanoplate, and/or nanoflower morphology towards enhancing the heat-fastness and color performance of said color pigments.

11 Claims, 41 Drawing Sheets
(1 of 41 Drawing Sheet(s) Filed in Color)

THERMALLY STABLE COLOR PIGMENTS WITH NANOFIBER COATING

CROSS-REFERENCE TO RELATED APPLICATIONS

This application claims priority from U.S. Provisional Patent Application No. 62/455,065 filed on Feb. 6, 2017, the disclosure of which is hereby incorporated by reference in its entirety.

FIELD OF INVENTION

The present invention relates to a method to coat oxide based color pigments with an ultrasound-assisted nano-coating of nanofiber in order to enhance heat-fastness and color performance of said color pigments. In particular, the present invention provides a method to coat oxide-based color pigments with nano-coating materials, including, but not limited to, alumina and/or silica at different dosage levels. The coatings have nanospike, nanoplate, nanoflower morphologies directed towards enhancing the heat-fastness and color performance of said color pigments.

BACKGROUND OF INVENTION

Yellow pigments such as iron oxide hydroxide, cadmium sulfide, strontium chromate, lead chromate and some organic pigments, e.g., benzidine yellow, have been extensively used for many different applications. Most of the inorganic pigments usually of aforementioned cadmium sulfide, strontium chromate and lead chromate provide good thermal stability except iron oxide hydroxide. However, these inorganic, thermally stable pigments are relatively expensive, toxic and carcinogenic. Furthermore, environmental consequence is another concern.

In contrast to the aforementioned inorganic pigments, synthetic iron oxide, an FDA-approved pigment, is relatively non-toxic and environmentally friendly. Iron oxide hydroxide ($\alpha$-FeOOH) is an inorganic yellow pigment, which exhibits general fastness properties against light, solvents, and hot weather. Furthermore, synthetic iron oxides are relatively low cost when compared to conventional pigments, such as those discussed above. Although yellow iron oxide is an economical yellow pigment, it lacks thermal stability.

Black iron oxide ($Fe_3O_4$) and yellow iron oxide ($\alpha$-FeOOH) are dehydrated when heated above approximately 200° C. and then transformed into reddish brown hematite ($\alpha$-$Fe_2O_3$) when the heating temperature is further increased to 230° C. For this reason, usage of yellow iron oxide is limited as a color pigment for the production of thermoplastics, such as high-density polyethylene, polypropylene, polycarbonates, etc., for which the processing temperature ranges from 200 to 300° C. Furthermore, the storage and transportation environments require special measures to prevent color change of black and yellow iron oxides due to dehydration occurring when stored at a relatively high temperature for a long period of time.

Since yellow iron oxide has the above-enumerated advantages when compared to conventional yellow pigments, it is desirable to perform further treatments of yellow iron oxide to enhance the thermal stability in order to constitute a useful alternative material.

Three main types of treatments have been proposed to overcome the problem of thermal instability of yellow iron oxide: (1) a hydrothermal treatment of yellow iron oxide in aqueous alkali solution to assist conversion of imperfect crystals to perfect crystal lattices (U.S. Pat. No. 3,969,494); (2) surface coating by precipitating other metal oxides/salts onto the surface of yellow iron oxide followed by a secondary hydrothermal treatment (U.S. Pat. Nos. 4,291,010, 4,374,676, 4,374,677 and 4,376,656); and (3) surface coating by precipitating other metal oxides/salts onto the surface of yellow iron oxide at ambient temperature (U.S. Pat. Nos. 4,053,325, 4,734,136 and 6,027,559). Aluminate is one of the most common compositions for the coating of yellow iron oxide to enhance the thermal stability.

In the cases of hydrothermal treatment, it is necessary to perform most of the treatments at relatively high temperatures and perform successive hydrothermal treatments. Therefore, the hydrothermal processes are relatively uneconomical. The table below summarizes some of the treatments for iron oxide pigments that have been developed in the past:

TABLE 1

Summary of technology improve thermal stability of yellow iron oxide

| U.S. Patent | Year | Assignee | Coating Composition | Thermal Stability | Process |
|---|---|---|---|---|---|
| 3,969,494 | 1976 | Agency of Industrial Science & Technology | N.A. | 250° C. | Hydrothermal treatment |
| 4,053,325 | 1977 | Pfizer | $Fe(PO_3)_2$ | 252° C. | Deposition of iron metaphosphate coating |
| 4,291,010 | 1981 | Titan | (FeAl)OOH | 283° C. | Hydrothermal treatment |
| 4,374,676 | 1983 | Titan | $\alpha$-$Sb_2O_3$ | 245° C. | Deposition of antimony oxide coating |
|  |  |  | N.A. | 301° C. | $2^{nd}$ hydrothermal treatment |
|  |  |  | (FeAl)OOH | 250° C. | Hydrothermal treatment |
| 4,374,677 | 1983 | Titan | (FeAl)OOH | 270° C. | $2^{nd}$ hydrothermal treatment |
|  |  |  | (FeAl)OOH + Sb | 270° C. | Hydrothermal treatment |

TABLE 1-continued

Summary of technology improve thermal stability of yellow iron oxide

| U.S. Patent | Year | Assignee | Coating Composition | Thermal Stability | Process |
|---|---|---|---|---|---|
| 4,376,656 | 1983 | Titan | (FeAl)OOH + Sb | 303° C. | $2^{nd}$ hydrothermal treatment |
| 4,734,136 | 1988 | Bayer | $(AlO)_xPO_4(OH)_{x-3}$ (x = 3 – 10) | 260-270° C. | Deposition of aluminum phosphate coating |
| 6,027,559 | 2000 | Toda | (FeAl)OOH | >265° C. | Deposition of aluminum iron oxide hydroxide coating |

There is a need in the art for cost-effective production of thermally stable yellow iron oxide. In particular, there is a need in the art for a method for depositing metal oxide/salt coatings on the surface of yellow iron oxide at ambient or low temperatures.

It is an object of the present invention to provide for an economical and practical method for coating oxide-based color pigments in order to enhance the heat-fastness and color performance of the color pigments.

Citation or identification of any reference in this section or any other section of this application shall not be construed as an admission that such reference is available as prior art for the present application.

SUMMARY OF INVENTION

Accordingly, an object of the invention relates to a method for coating oxide-based color pigments with a coating of nanofibers in order to enhance the heat-fastness and color performance of the color pigments. In particular, the present invention provides a method to coat oxide-based color pigments with nano-sized coating materials, including but not limited to, alumina and/or silica at different dosage levels, with nanofiber, nanospike, and nanoplate, nanoflower morphologies to enhance the heat-fastness and color performance of the color pigments.

In one aspect, the present invention provides a method of increasing the thermal stability of iron oxide pigments comprising placing iron oxide pigment in a coating material precursor solution, wherein the coating material precursor solution is a precursor of one or more of aluminum oxide and silicon oxide, treating the iron oxide pigment and coating material precursor solution with ultrasound at a temperature of less than 100° C. to promote nanoparticle formation on the iron oxide pigment and growing the coating from the coating material precursor solution to form nanoparticles of one or more of the aluminum oxide and/or silicon oxide on the surface of the iron oxide pigment such that the resulting iron oxide pigment is thermally stable to a temperature of at least 230° C.

In accordance to various embodiments of the method, the aluminum oxide precursor can be an aluminum sulphate; the silicon oxide precursor can be tetraethylorthosilicate or aminopropyl triethylsilane; the iron oxide pigment can be FeOOH yellow iron oxide; and the nanoparticles can be selected from nanofiber, nanoneedle, nanospike, nanoplate, or nanoflower morphologies, or mixtures thereof.

In accordance to various embodiments of the method, the ultrasound treatment is applied for a period of approximately 5 minutes to 120 minutes; the temperature during ultrasound treatment is approximately 40-80° C.; the pH during the ultrasound treatment is controlled to between approximately 7-8; the ultrasound-treated material is aged for a period of between approximately 5 minutes and approximately 240 minutes; and the ultrasound treatment occurs at a frequency where the ultrasound wavelength is approximately an integral multiple of a rod length of the iron oxide pigment with one of the treatment frequencies being between approximately 40 and 55 kHz.

In another aspect, the present invention provides a yellow iron oxide pigment coated with one or more of aluminium oxide and/or silicon oxide nanoparticles selected from nanofibers, nanospikes, nanoneedles, nanoplates, or nanoflowers or mixtures thereof that is thermally stable to at least approximately 230° C., made by the aforesaid method in one or more of its various embodiments.

Throughout this specification, unless the context requires otherwise, the word "include" or "comprise" or variations such as "includes" or "comprises" or "comprising", will be understood to imply the inclusion of a stated integer or group of integers but not the exclusion of any other integer or group of integers. It is also noted that in this disclosure and particularly in the claims and/or paragraphs, terms such as "included", "comprises", "comprised", "comprising" and the like can have the meaning attributed to it in U.S. Patent law; e.g., they can mean "includes", "included", "including", and the like; and that terms such as "consisting essentially of" and "consists essentially of" have the meaning ascribed to them in U.S. Patent law, e.g., they allow for elements not explicitly recited, but exclude elements that are found in the prior art or that affect a basic or novel characteristic of the present invention.

Furthermore, throughout the specification and claims, unless the context requires otherwise, the word "include" or variations such as "includes" or "including", will be understood to imply the inclusion of a stated integer or group of integers but not the exclusion of any other integer or group of integers.

Other definitions for selected terms used herein may be found within the detailed description of the present invention and apply throughout. Unless otherwise defined, all other technical terms used herein have the same meaning as commonly understood to one of ordinary skill in the art to which the present invention belongs.

Other aspects and advantages of the present invention will be apparent to those skilled in the art from a review of the ensuing description.

BRIEF DESCRIPTION OF DRAWINGS

The patent or application file contains at least one drawing executed in color. Copies of this patent or patent application publication with color drawing(s) will be provided by the Office upon request and payment of the necessary fee.

The above and other objects and features of the present invention will become apparent from the following description of the present invention, when taken in conjunction with the accompanying drawings, in which.

DETAILED DESCRIPTION OF THE INVENTION

Figure 1:
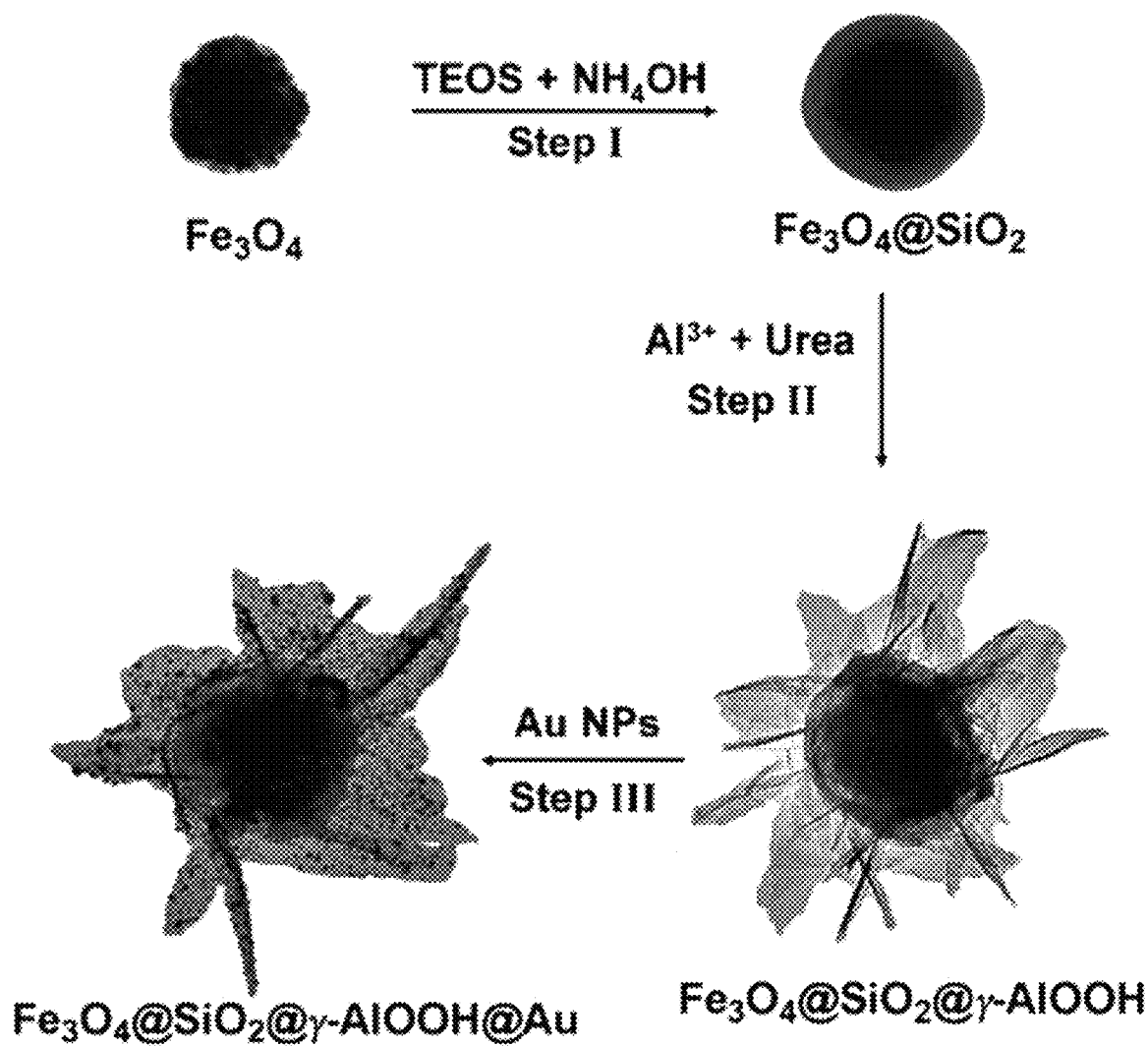
FIG. 1 shows a graphical illustration with TEM images of preparation of hierarchical core/shell $Fe_3O_4@SiO_2@\gamma\text{-}AlOOH@Au$ micro/nanoflowers.
Figure 2:
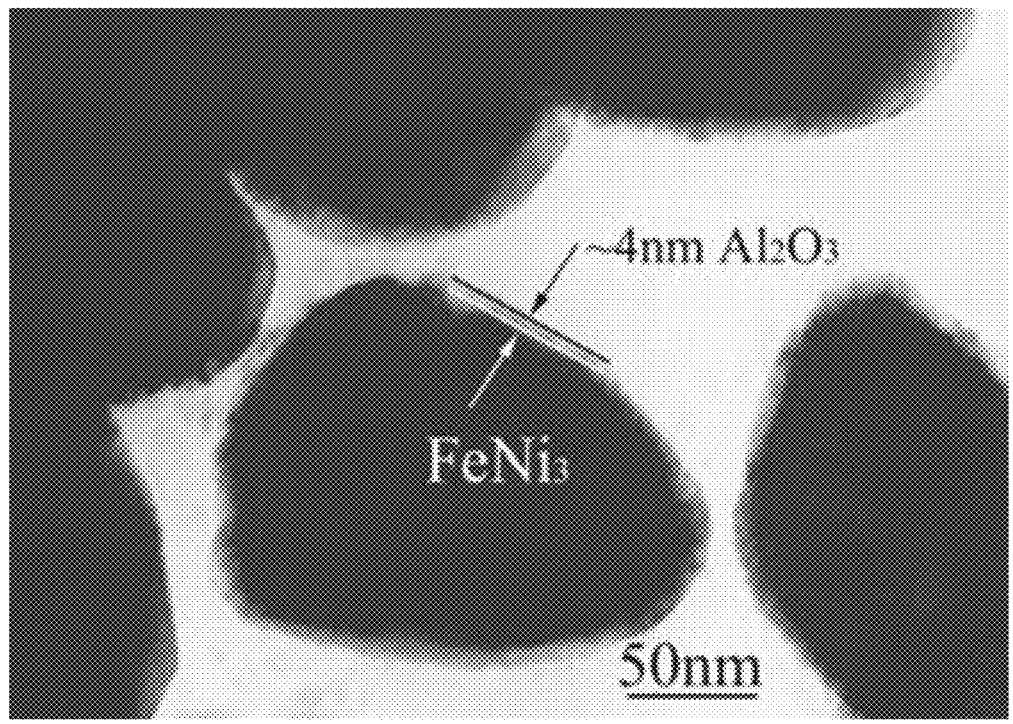
FIG. 2 shows a TEM image of $FeNi_3/Al_2O_3$ core/shell nanocomposites.
Figure 3:
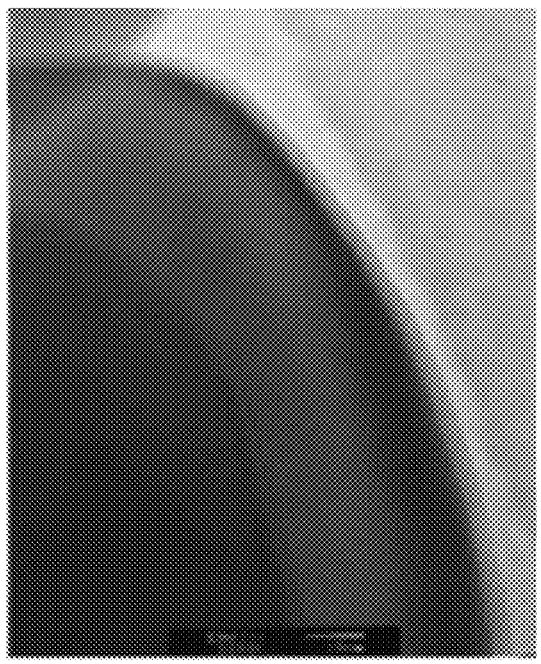
FIG. 3 shows a TEM image of a $TiO_2@AlOOH$ core/shell particle.
Figure 4A:
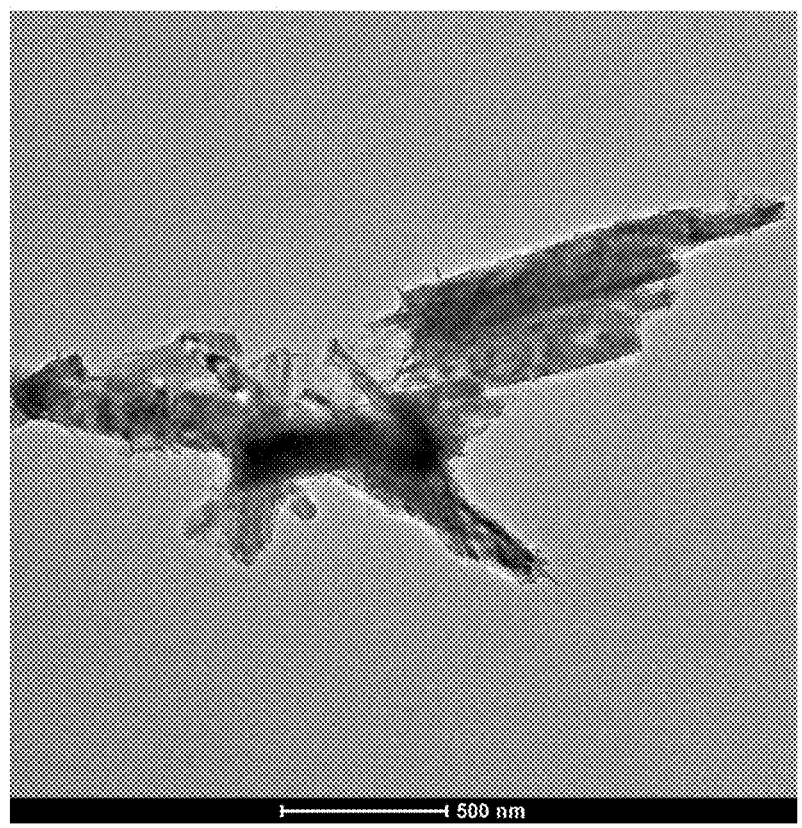
FIG. 4A shows one TEM image of hierarchical $Al_2O_3$ and $SiO_2$ coating structure on yellow iron oxide.
Figure 4B:
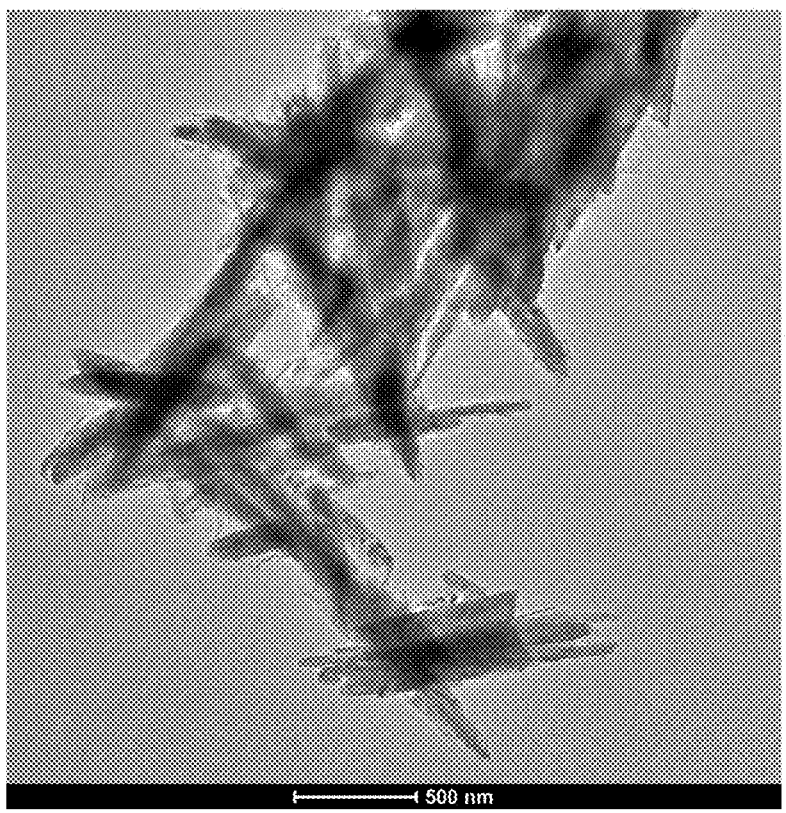
FIG. 4B shows another TEM image of hierarchical $Al_2O_3$ and $SiO_2$ coating structures on yellow iron oxide.
Figure 4C:
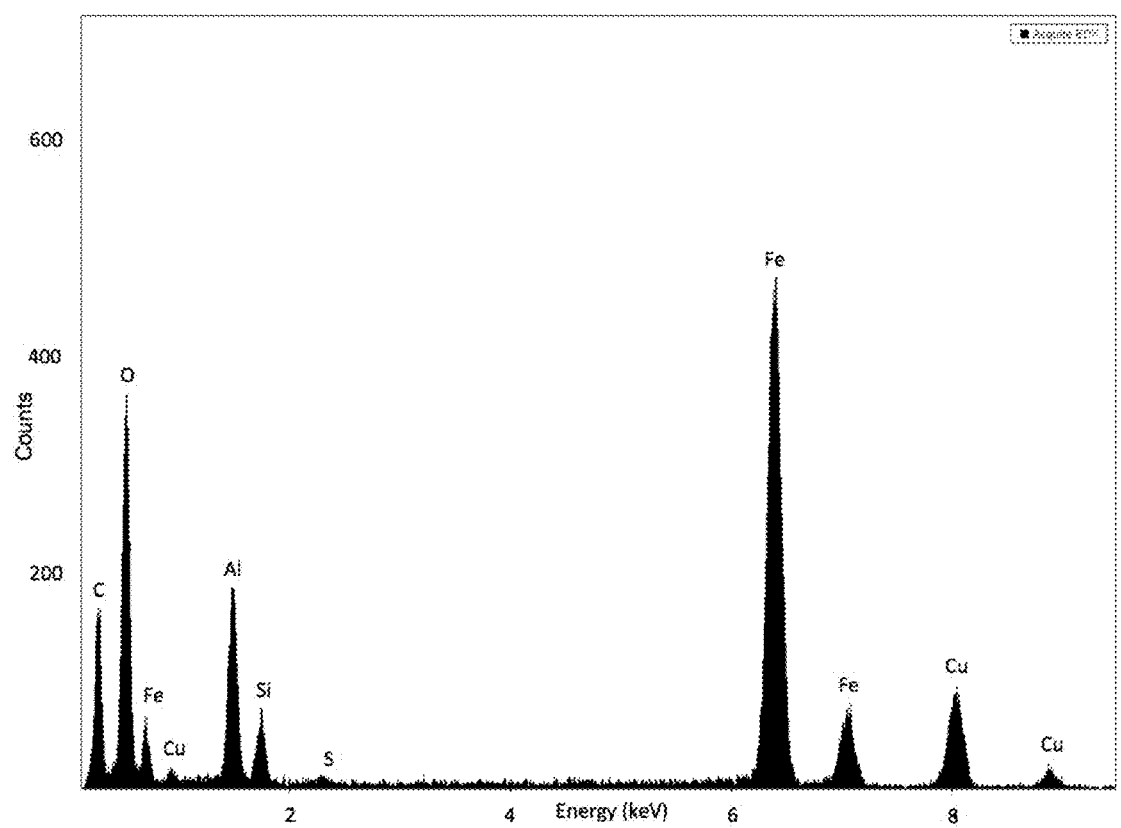
FIG. 4C shows the EDX spectrum of hierarchical $Al_2O_3$ and $SiO_2$ coating structures on yellow iron oxide.
Figure 5:
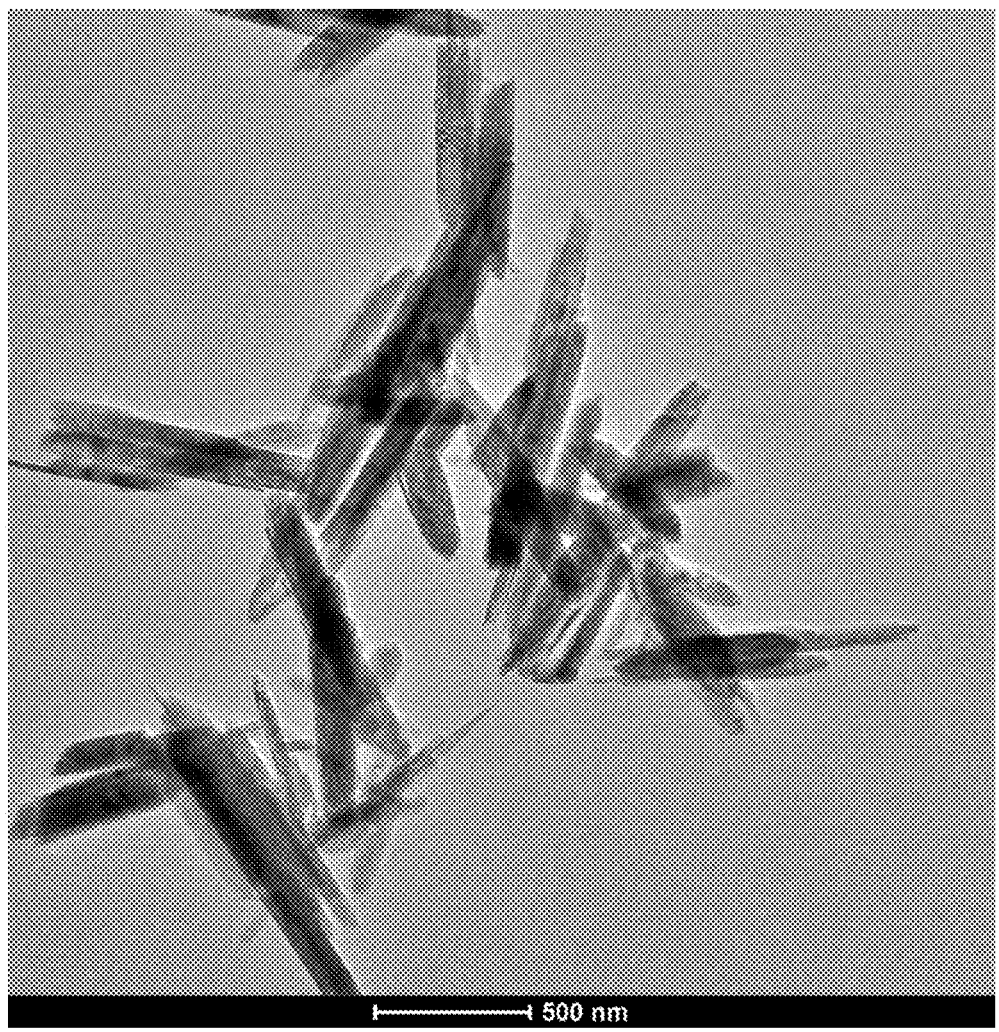
FIG. 5 shows a transmission electron microscopic image of yellow iron oxide rods.
Figure 6:
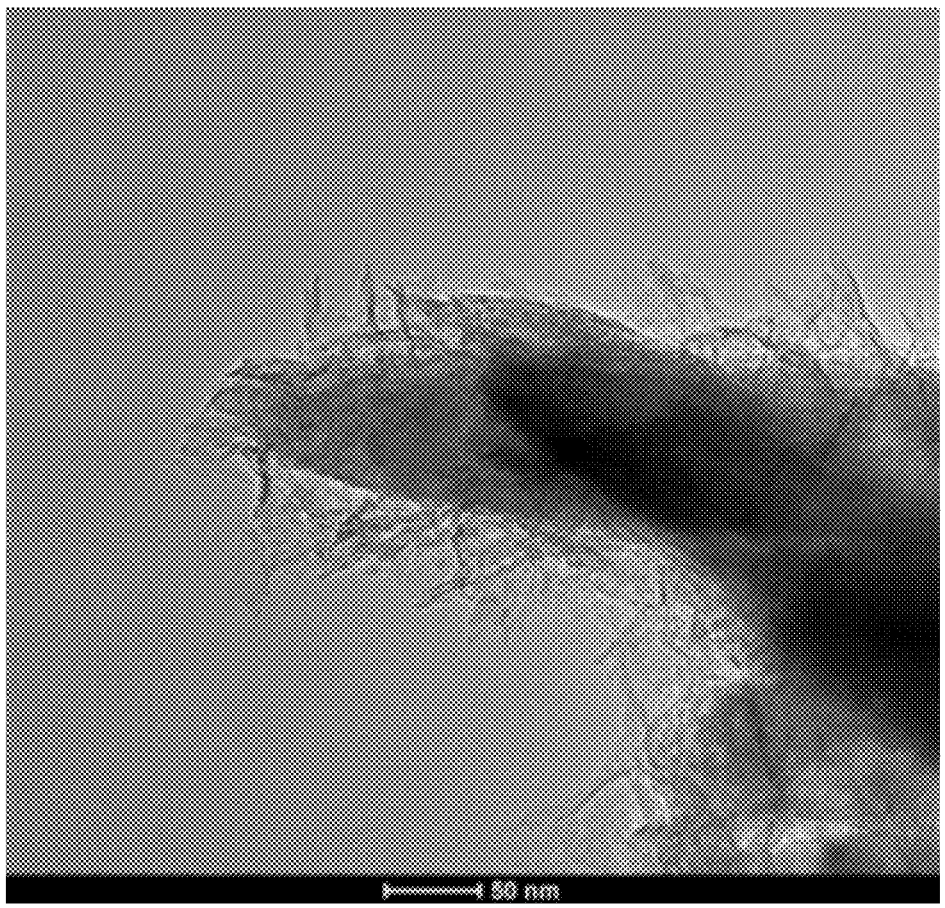
FIG. 6 shows a transmission electron microscopic image of yellow iron oxide rods with alumina nanofiber coating.
Figure 7A:
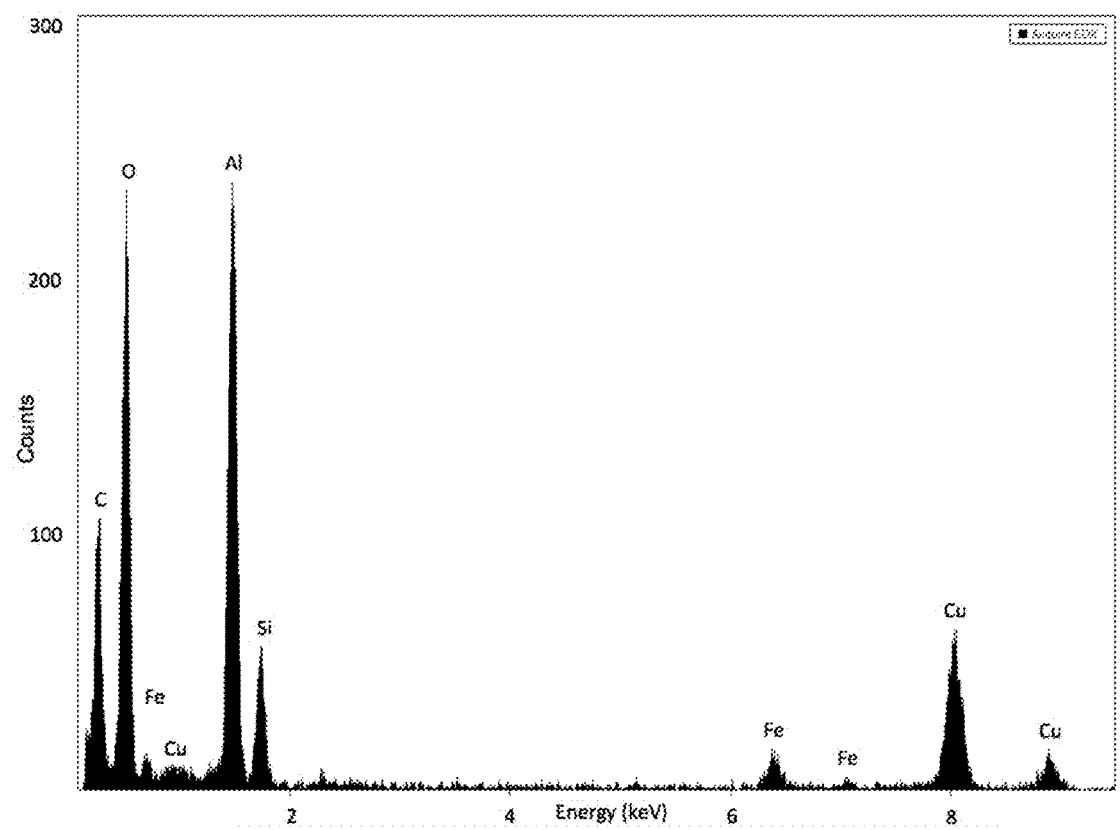
FIG. 7A shows one embodiment of a nanofiber coating for 45 kHz frequency of EDX spectra.
Figure 7B:
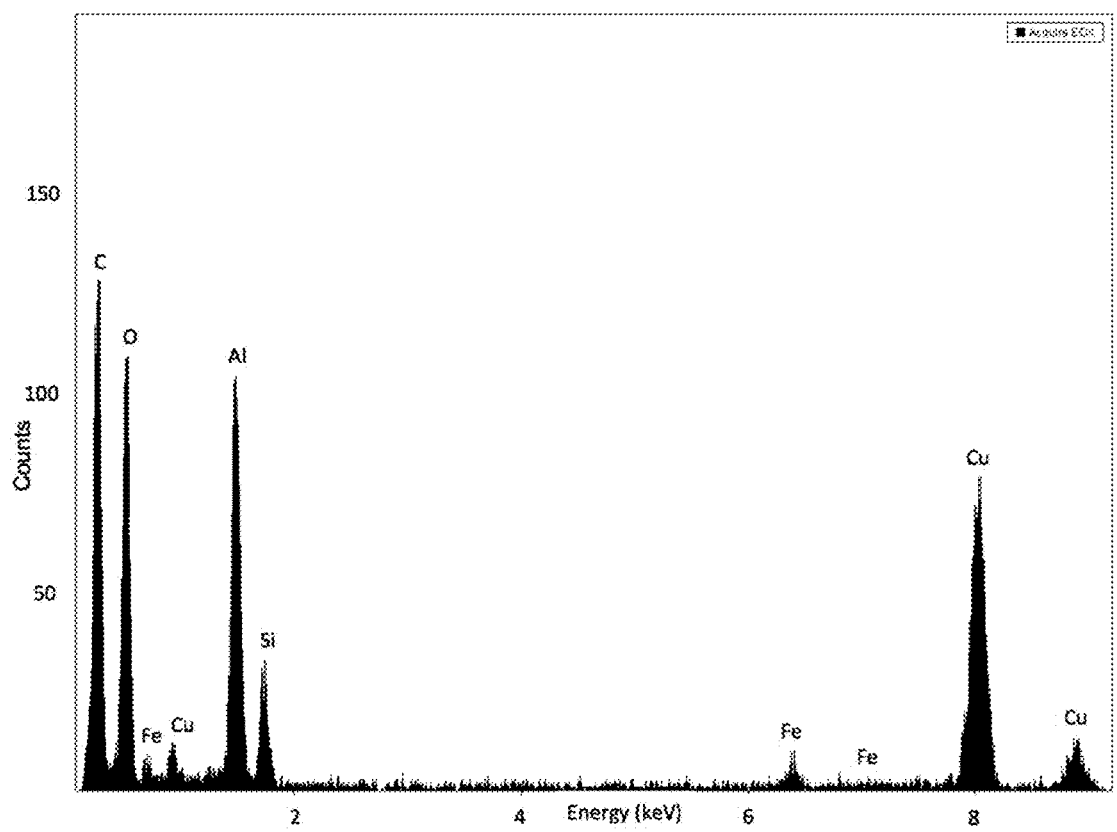
FIG. 7B shows another embodiment of a nanofiber coating for 45 kHz frequency of EDX spectra.
Figure 7C:
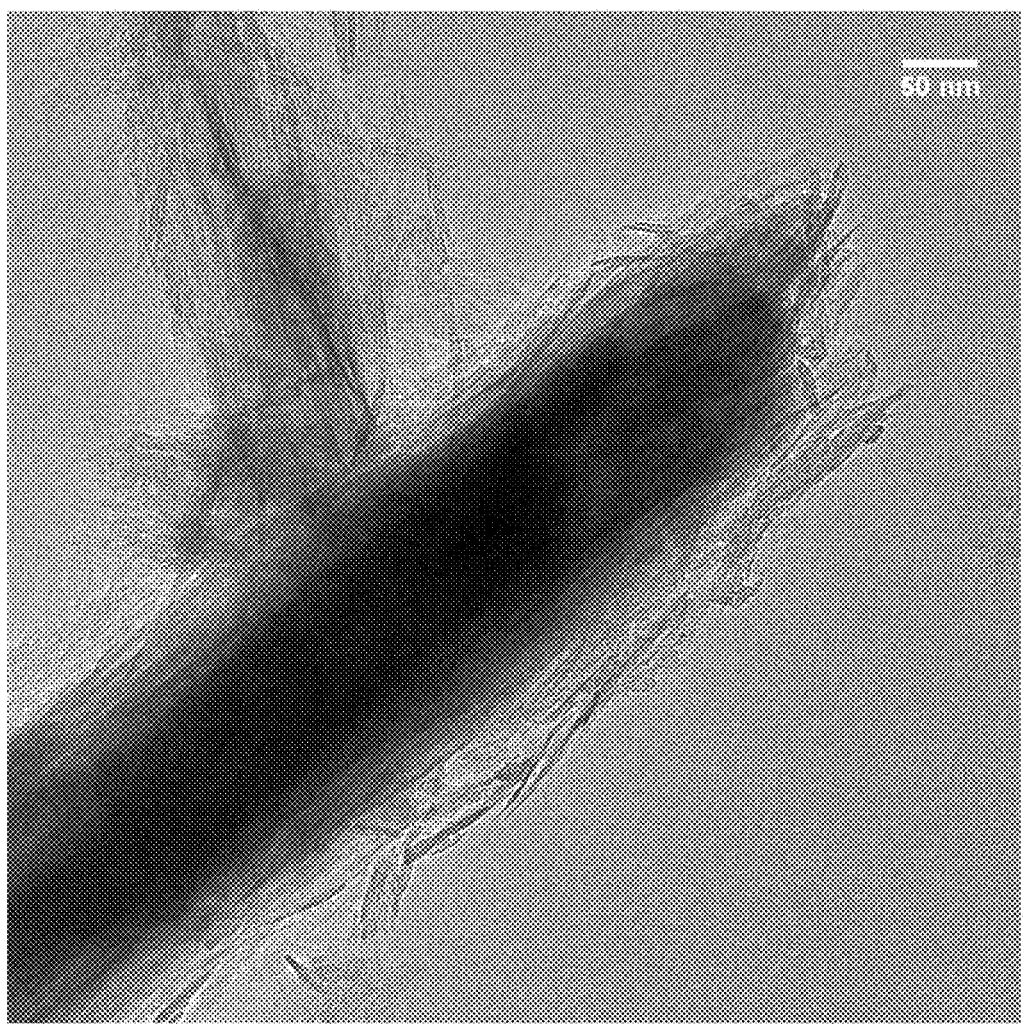
FIG. 7C shows the TEM image corresponding to the one embodiment of a nanofiber coating for 45 kHz frequency of EDX spectra as shown in FIG. 7A.
Figure 7D:
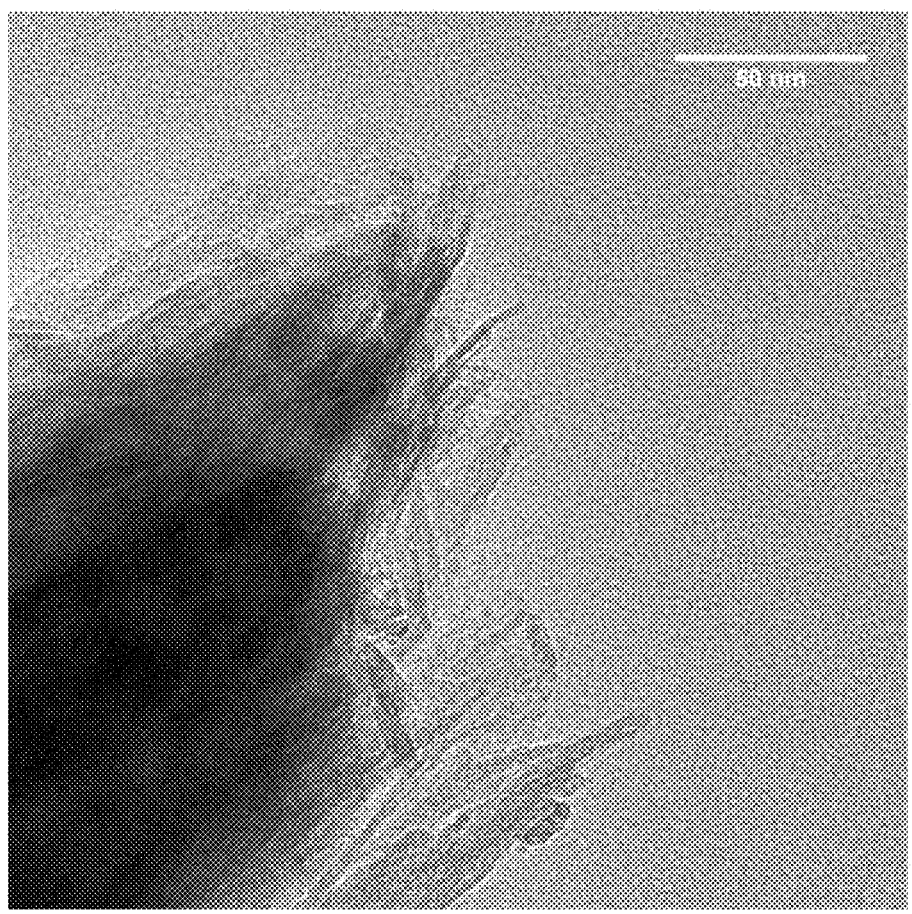
FIG. 7D shows the TEM image corresponding to another embodiment of a nanofiber coating for 45 kHz frequency of EDX spectra as shown in FIG. 7B.
Figure 9:
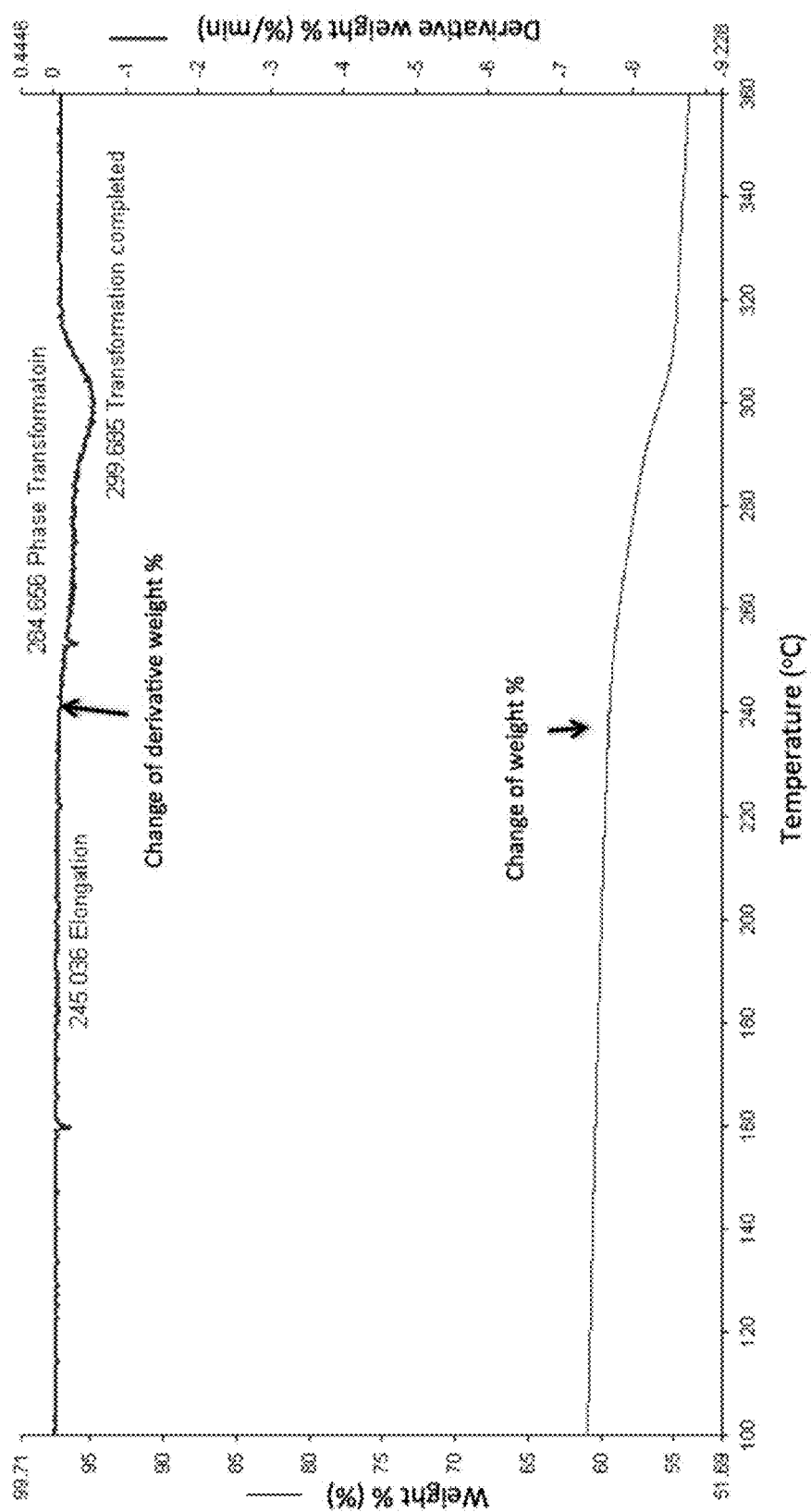
FIG. 9 shows a TGA plot for yellow iron oxide rods with alumina nanofiber coatings, depicting the start of a phase transformation at 264° C. (lower line) as well as the first derivative (upper line) revealing a complete phase transformation at 265-300° C.
Figure 10:
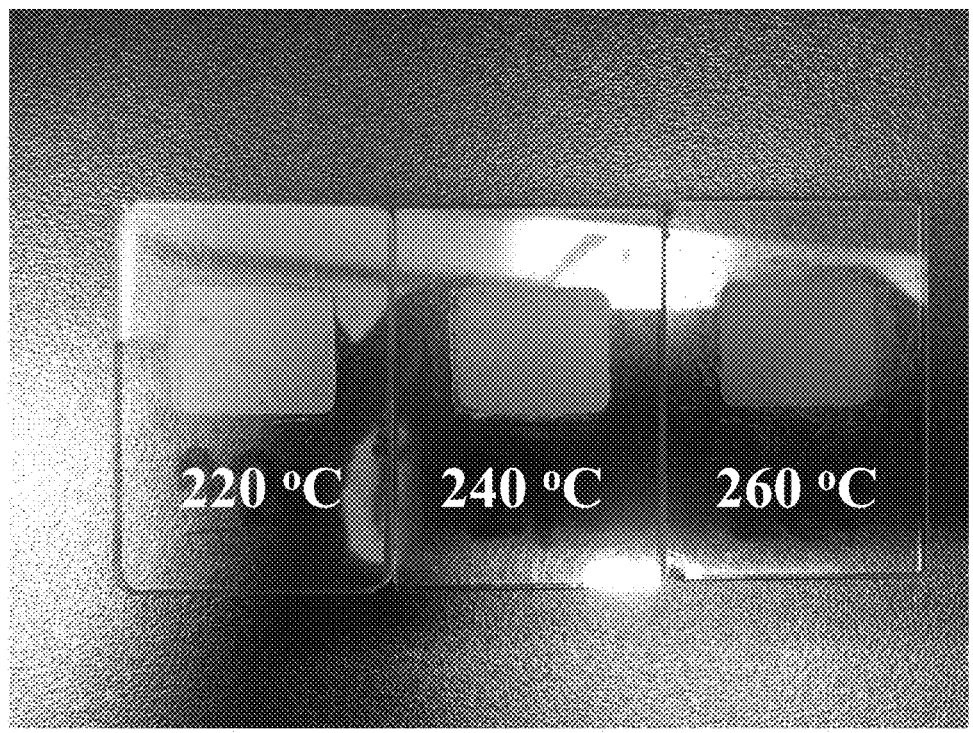
FIG. 10 shows yellow iron oxide rods with alumina nanofiber coatings, revealing a color change for temperatures over 240° C.
Figure 16:
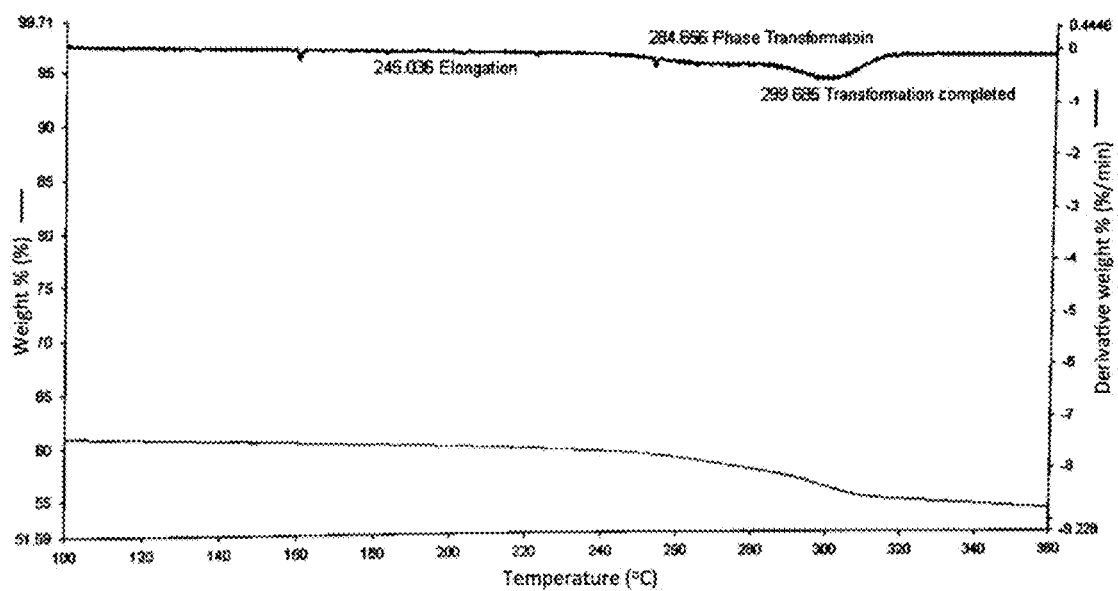
FIG. 16 shows TGA results of YIO coated with alumina under sonication at 45 kHz.

The present invention is further illustrated by the following embodiments and examples which may only be used for illustrative purpose but are not intended to limit the scope of the presently-claimed invention. The present inventors have invented a method to coat color pigments with coatings (FIGS. 2 and 3) of nanofibers (FIG. 1) or other nanostructures such that the color pigments are enhanced in heat-fastness (FIGS. 9 and 16), color performance (FIG. 10), and oil repulsion performance (oil absorption of raw yellow iron oxide rod: 0.431 g per gram of iron oxide; oil absorption of yellow iron oxide with alumina nanofiber coating: 0.349 g per gram of iron oxide). The method involves application of ultrasound to promote growth of nano structures on pigment particles. The present invention is more economical and practical over the prior art presented in Table 1.

In particular, the present invention may be carried out at relatively low temperatures of less than 100° C. In a further aspect, the methods of the present invention may be carried out at temperatures of approximately 80° C. or less or approximately 60° C. or less. In one aspect, the method may be carried out at temperatures ranging from 5° C. to 35° C.

In the present invention, precursor solutions or suspensions are mixed with iron oxide pigments. In particular, precursor solutions or suspensions of aluminum oxide and/or silicon oxide are used to form coatings of aluminum oxide and/or silicon oxide of various morphologies.

While the iron oxide is subjected to the precursor coating solution or suspension of aluminum oxide and or silicon oxide, ultrasound is applied for approximately 5-120 minutes at a frequency between approximately 40 and 55 kHz.

Following the ultrasound treatment, further growth of the nanostructured coatings is promoted during an aging process. The resultant nanoparticle-coated iron oxide is thermally stable to a temperature of at least approximately 230° C. Note that ultrasound is applied to promote growth of a nanostructured coating on the iron oxide pigment. That is, ultrasound is not merely used to disperse various mixture components, it is used to cause the growth of the nanostructured coatings. Without being bound by any particular mechanism, it is speculated that treatment with ultrasound and, in particular, treatment with a resonant frequency of ultrasound, may assist in the nucleation and growth of various nano structures. It is understood that particularly useful frequencies of ultrasound may vary with the size and geometry of containers and the volume of the mixture, the amount and size of the starting materials, etc. and that, for some container configurations, treatment at other than resonant frequencies may best promote nanostructure growth. Thus the particular frequencies set forth above have been shown to promote nanostructure crystal growth for the conditions set forth in the Example. However, those of ordinary skill in the art will appreciate that other frequencies may promote crystal growth with larger batch sizes, larger containers, larger mixture volumes, etc.

For aluminum oxide coatings, precursor solutions include anhydrous $Al_2(SO_4)_3$, $Al_2(SO_4)_3 \cdot 9H_2O$, $Al_2(SO_4)_3 \cdot 12H_2O$, $Al_2(SO_4)_3 \cdot 16H_2O$, $Al_2(SO_4)_3 \cdot 18H_2O$ and any $Al_2(SO_4)_3$ hydrates. For silicon oxide coatings, precursor solutions include silicates and silanes such as, for example, tetraethylortho silicate and aminopropyl triethylsilane.

The iron oxide pigment may be placed in suspension and added to a coating solution of a coating precursor material for coating growth from a precursor solution. In an exemplary embodiment, the iron oxide pigment coated is FeOOH yellow iron oxide pigment.

With more details provided in an exemplary embodiment, 50-500 grams of yellow iron oxide slurry may be dispersed in 300-3000 milliliter of water upon sonication for 5-180 minutes. The dispersed yellow iron oxide may be heated to 40-80° C. with vigorous stirring using mechanical stirrer. 50-500 grams of aluminum sulphate hydrate may be dissolved in 70-350 milliliter of water by heating and stirring. The solution may be transferred to a burette. 1-10 M sodium hydroxide solution may be prepared and transferred to another burette. Aluminum sulphate and sodium hydroxide solutions may be added simultaneously to the dispersed yellow iron oxide under ultrasonication at 40-80° C. while controlling the pH at 7-8. Aging may be performed as the mixture is stirred vigorously at 40-80° C. for another 5-240 minutes. The product may then be collected and washed with large amounts of water.

Example 1

This example relates to the coating of yellow iron oxide with alumina or silica of different morphologies. FIGS. 4A to 4C and FIGS. 5 to 6 depict coatings of alumina nanoneedles and alumina nanofibers. To produce the alumina coatings on the iron oxide, the following experimental conditions are used: FeOOH (100 g) yellow iron oxide pigment was well dispersed in a beaker with 600 mL deionized water by ultrasound sonication (45 kHz) and stirring for 3 hours.

$Al_2(SO_4)_3 \cdot 9H_2O$ (186.8 g) was dissolved in minimal amount of deionized water and acidified with 0.1 M $H_2SO_4$ before solvation. The acidic solution was heated and stirred using a stirrer bar.

Well-dispersed FeOOH was heated to the temperatures shown in Table 3 and vigorously stirred using mechanical stirrer.

The acidic aluminium sulphate solution and concentrated NaOH solution were added together dropwisely into the FeOOH mixture with ultrasound sonication (45 kHz). The pH value of the mixture was controlled at 7-8.

After adding all acidic aluminium sulphate solution, the final concentration of the FeOOH mixture was made up to 100 g/L with deionized water.

Following ultrasonic treatment, aging is performed to grow the various coatings on the iron oxide. The aging conditions are shown in Table 4.

The product was collected by filtration and air-dried overnight.

Figure 8A:
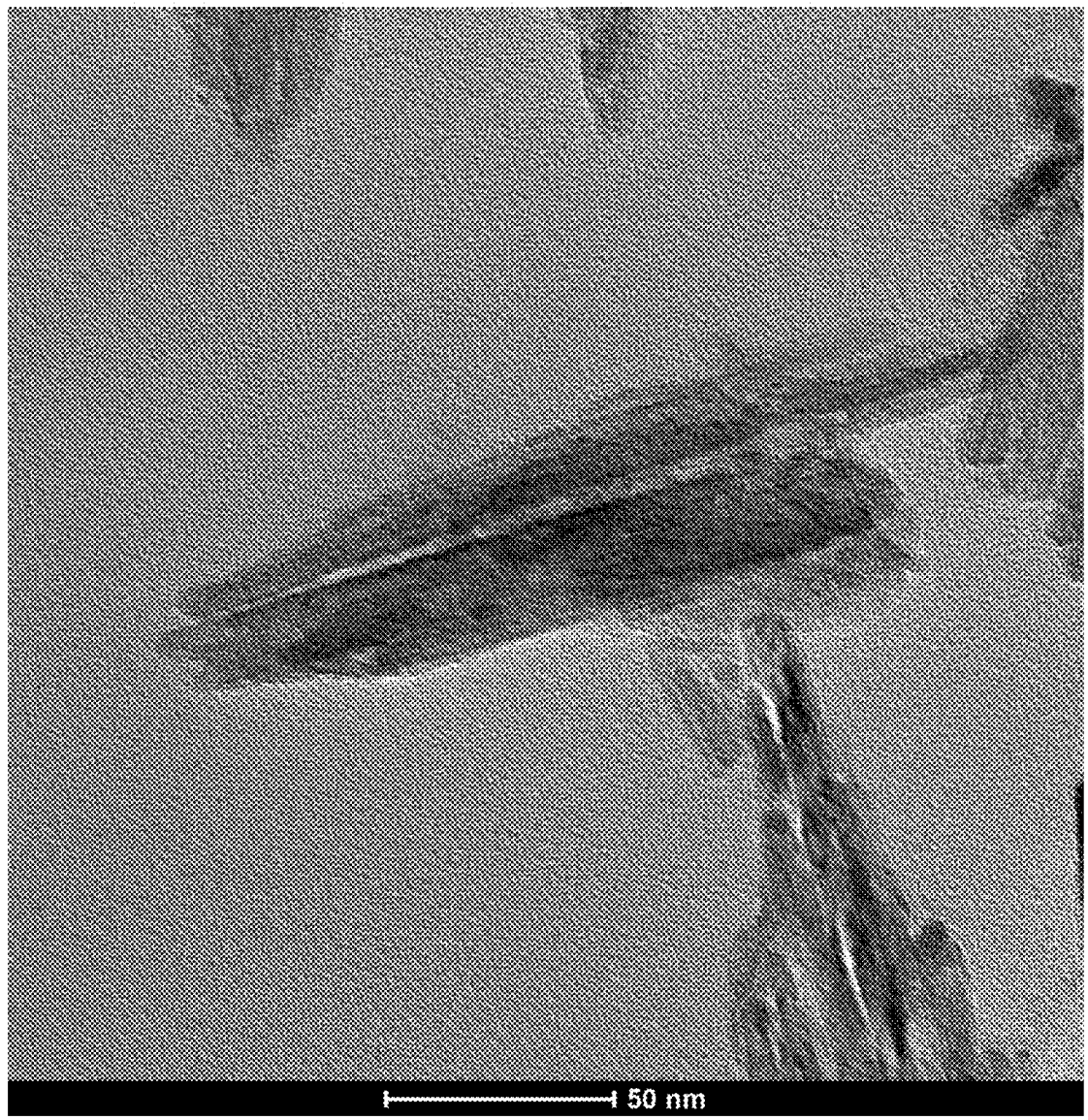
FIG. 8A shows a TEM image at a high magnification, revealing almost no nanofiber coating for a 25 kHz frequency.
Figure 8B:
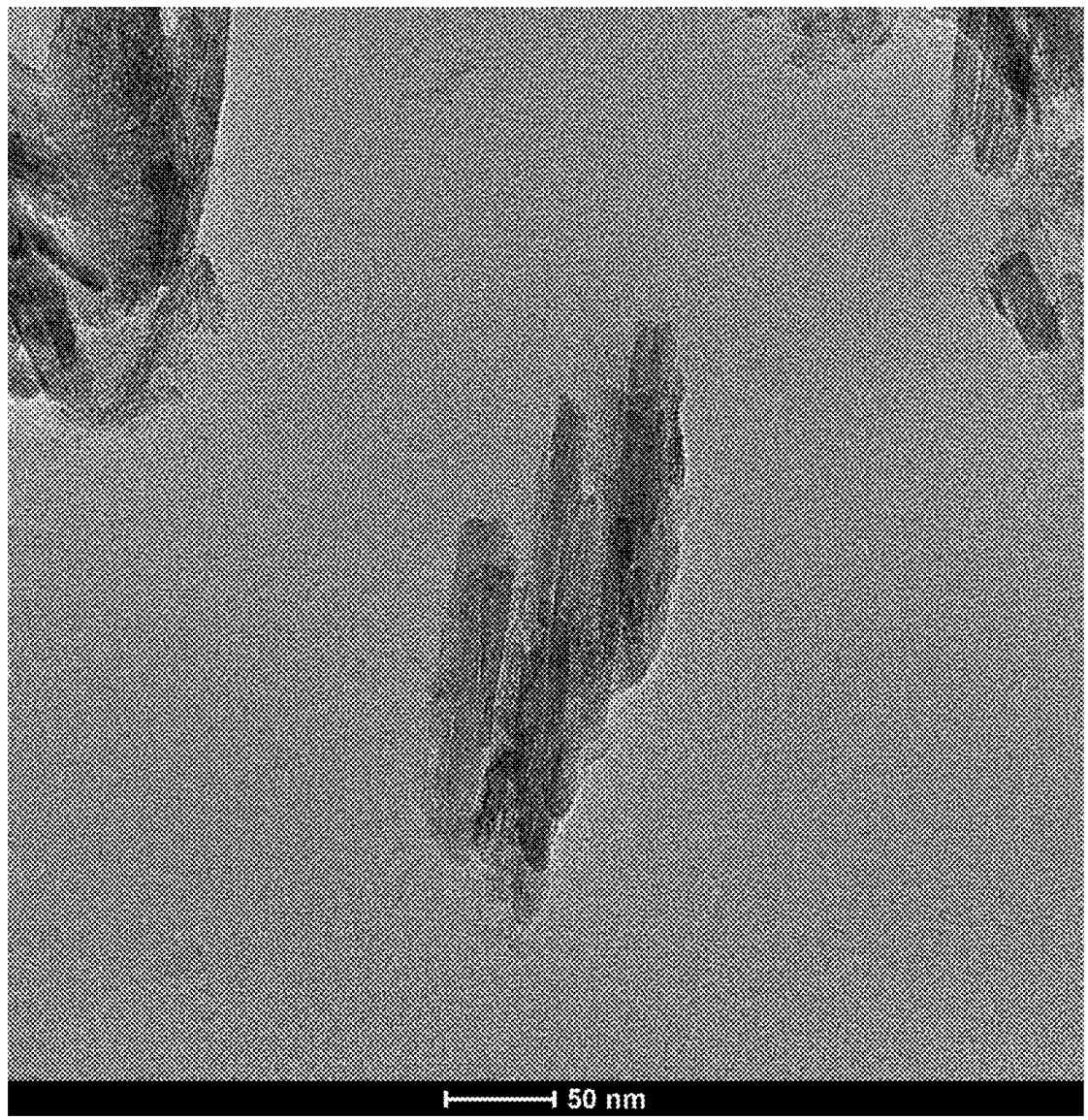
FIG. 8B shows a TEM image at high magnification and an EDX spectrum, revealing almost no nanofiber coating for a frequency of 35 kHz.
Figure 8C:
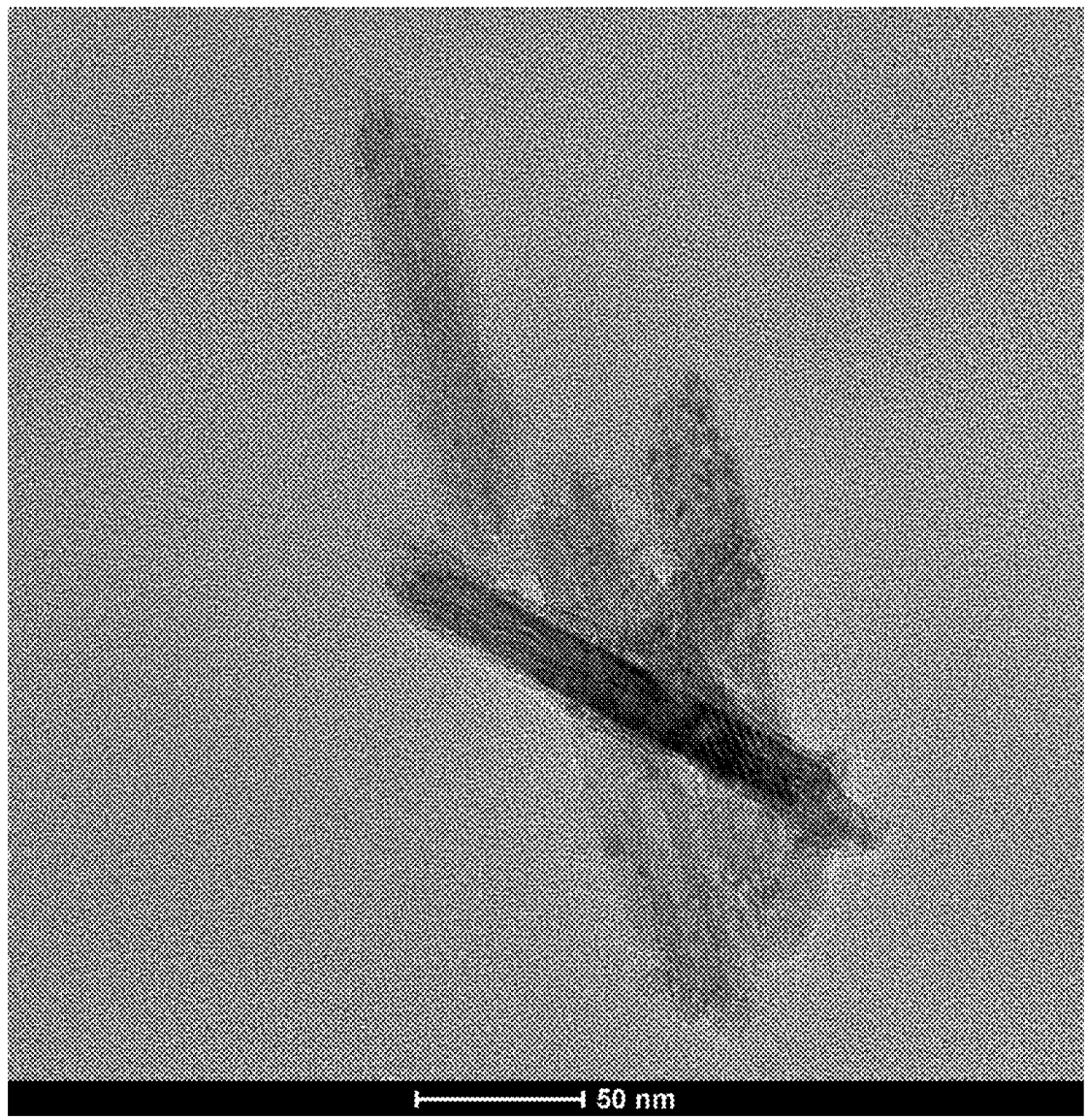
FIG. 8C shows a TEM image at high magnification and an EDX spectrum, revealing almost no nanofiber coating for a frequency of 130 kHz.
Figure 11A:
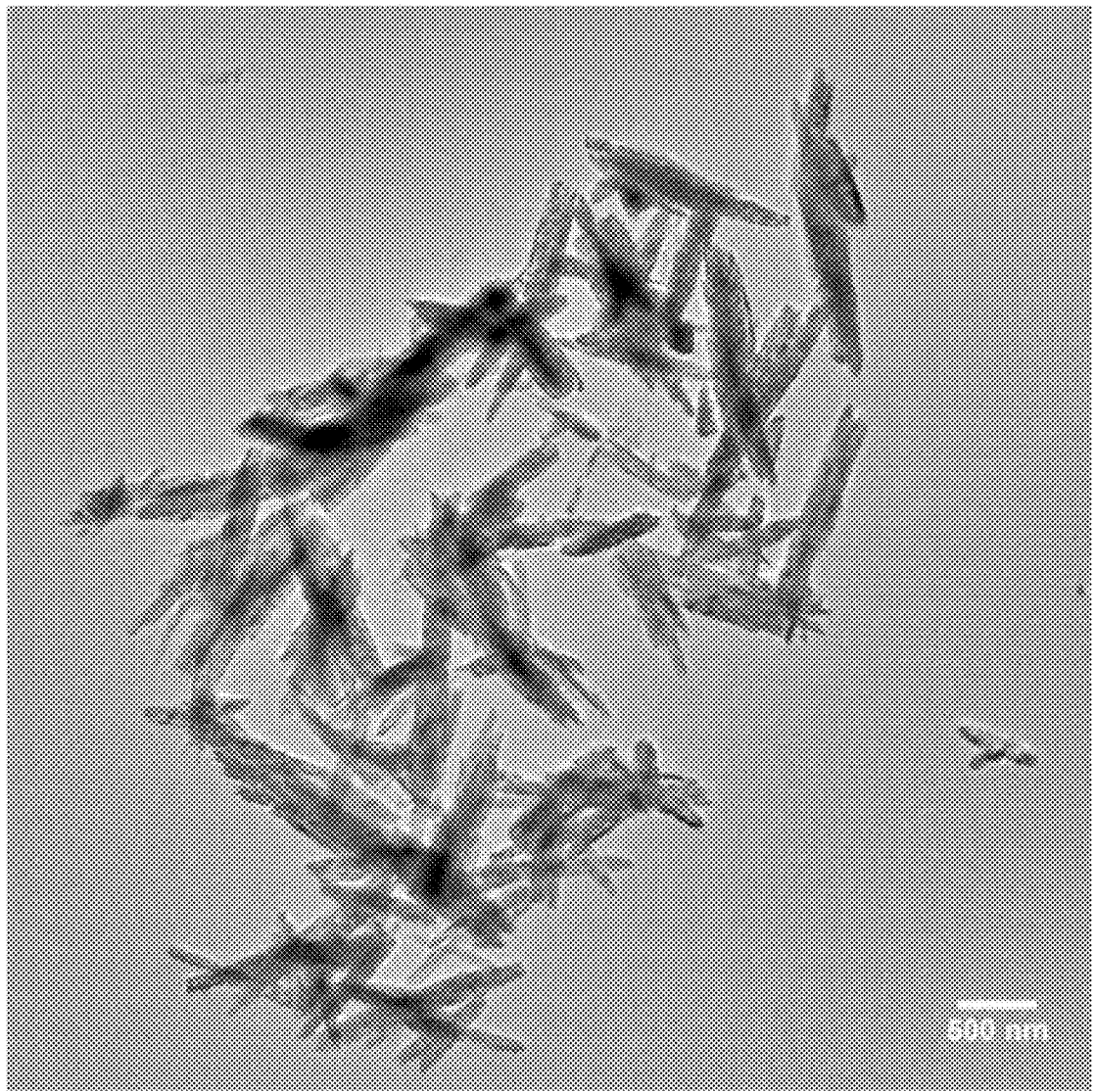
FIG. 11A shows a TEM image at a low magnification, revealing almost no nanofiber coating for frequency of 25 kHz.
Figure 11B:
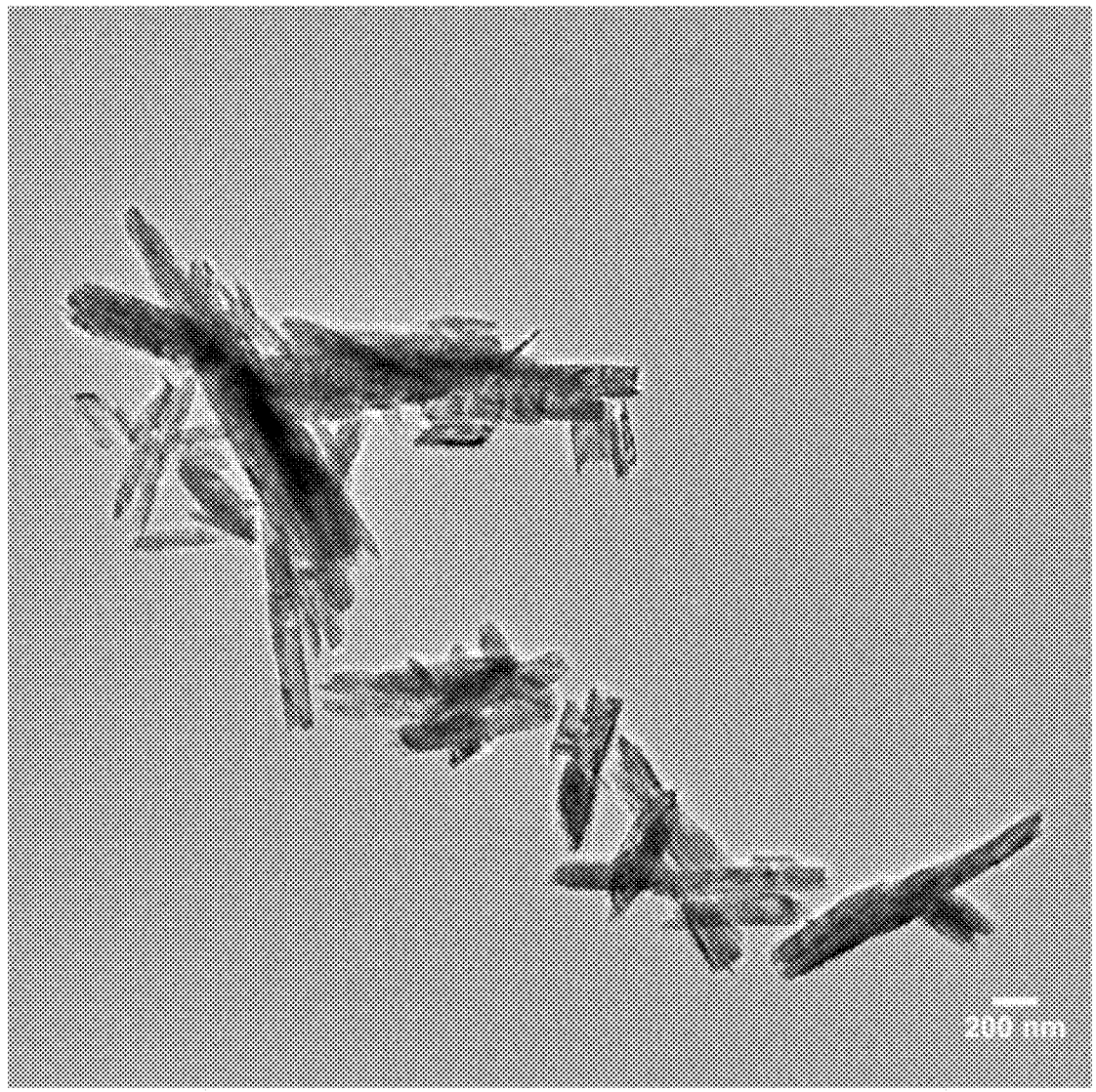
FIG. 11B shows a TEM image at a medium magnification, revealing almost no nanofiber coating for a frequency of 25 kHz.
Figure 11C:
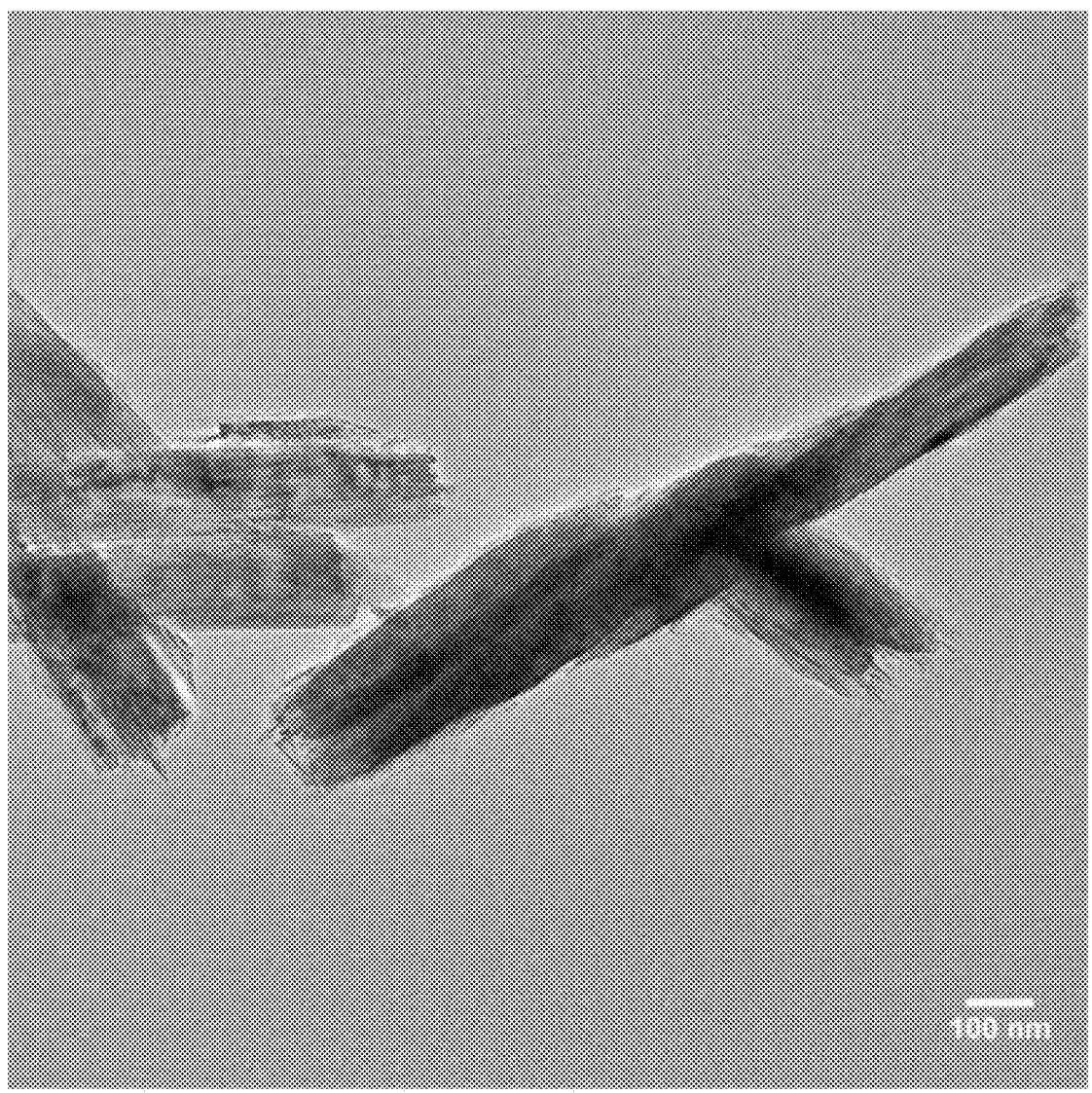
FIG. 11C shows a TEM image at a high magnification, revealing almost no nanofiber coating for a frequency of 25 kHz.
Figure 12A:
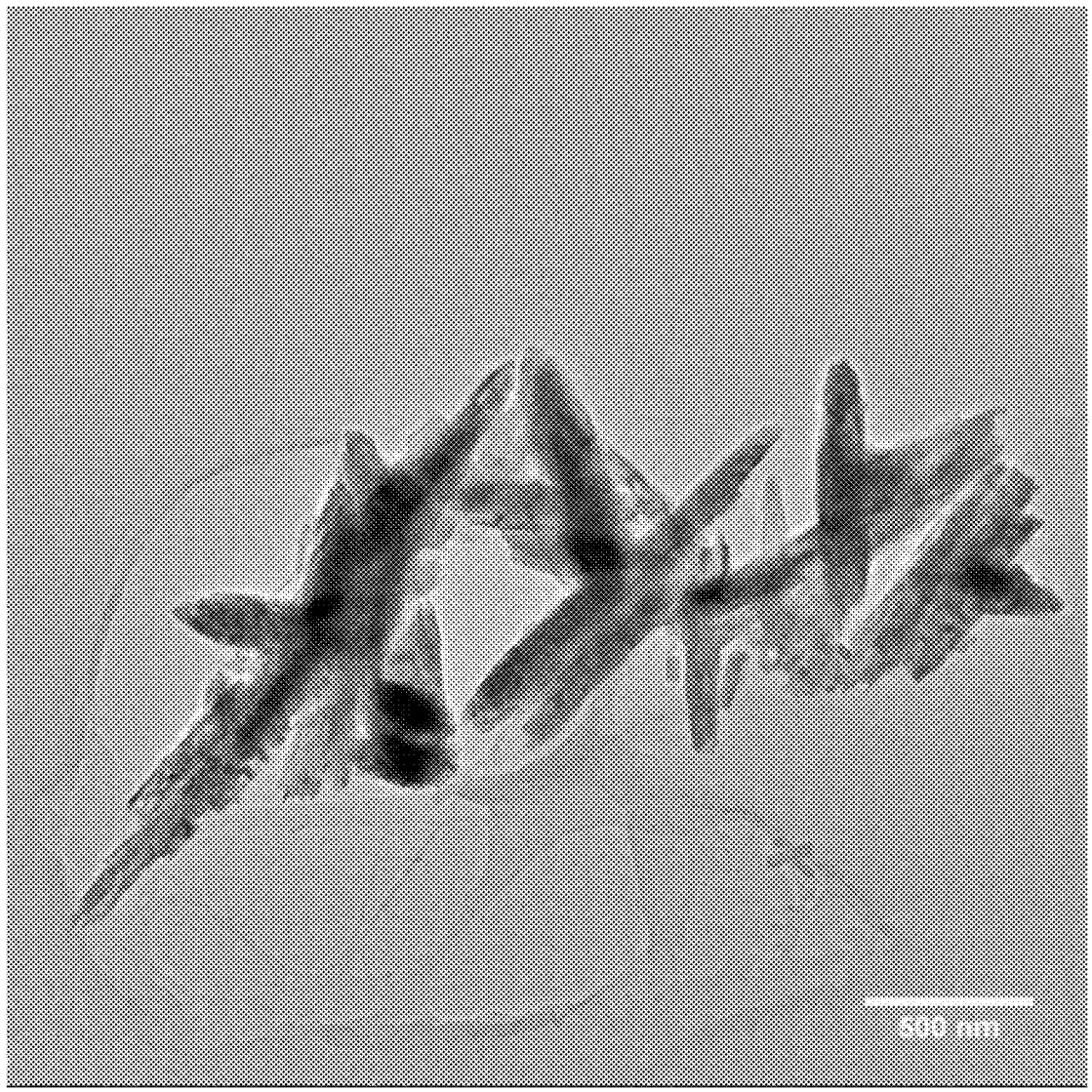
FIG. 12A shows a TEM image at a low magnification, revealing almost no nanofiber coating for a frequency of 25 kHz.
Figure 12B:
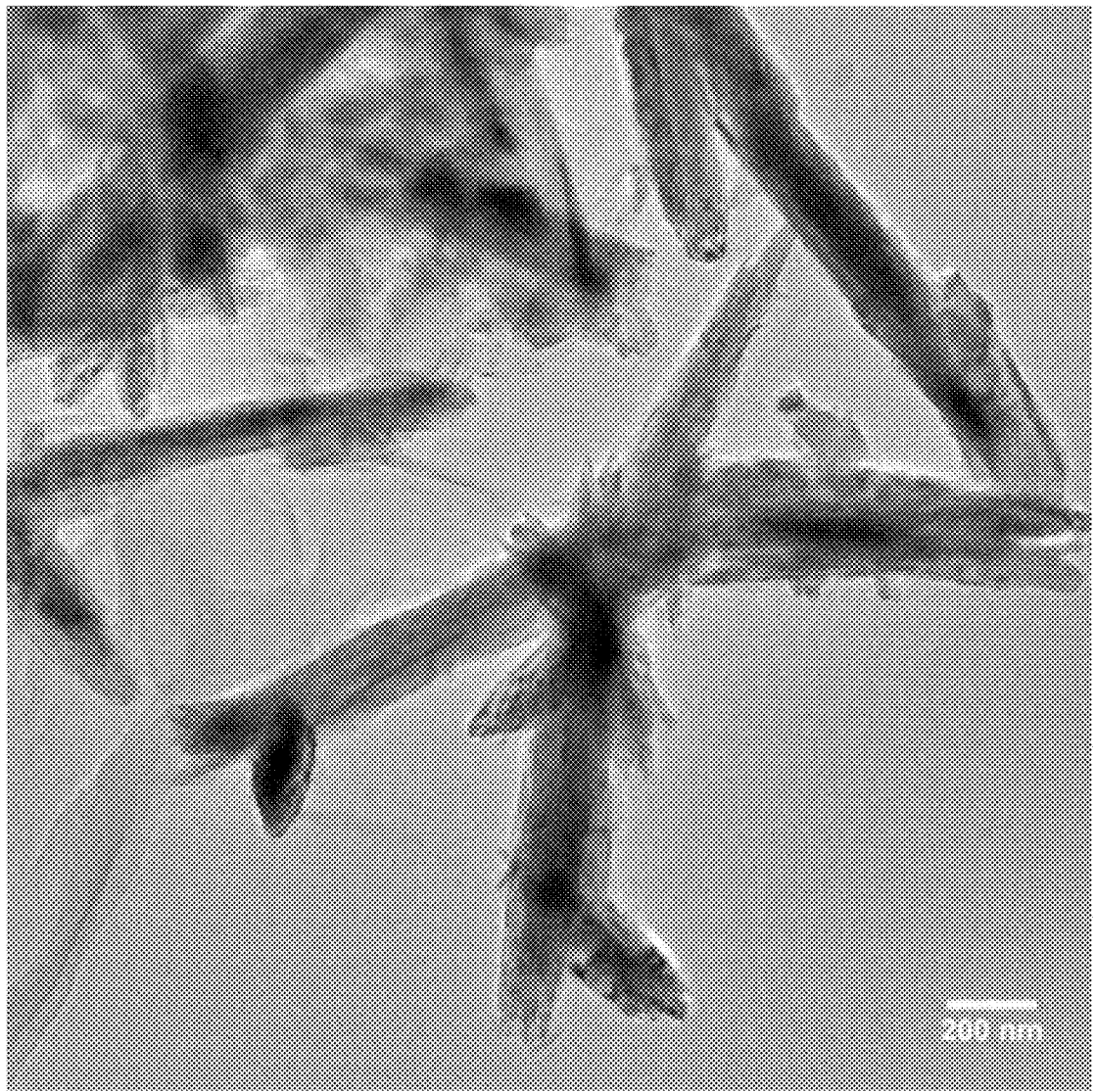
FIG. 12B shows a TEM image at a medium magnification, revealing almost no nanofiber coating for a frequency of 25 kHz.
Figure 12C:
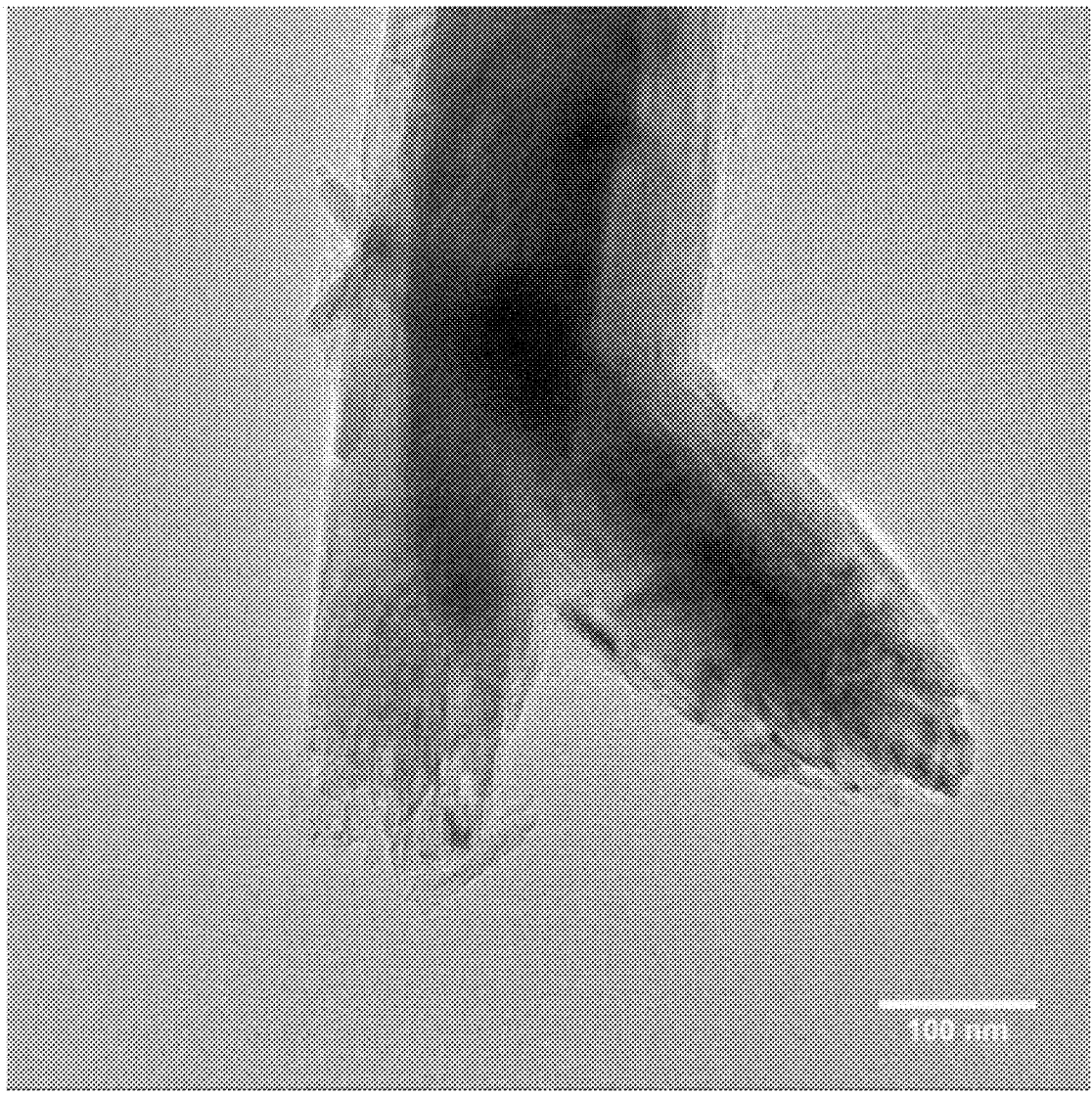
FIG. 12C shows a TEM image at a high magnification, revealing almost no nanofiber coating for a frequency of 25 kHz.
Figure 13A:
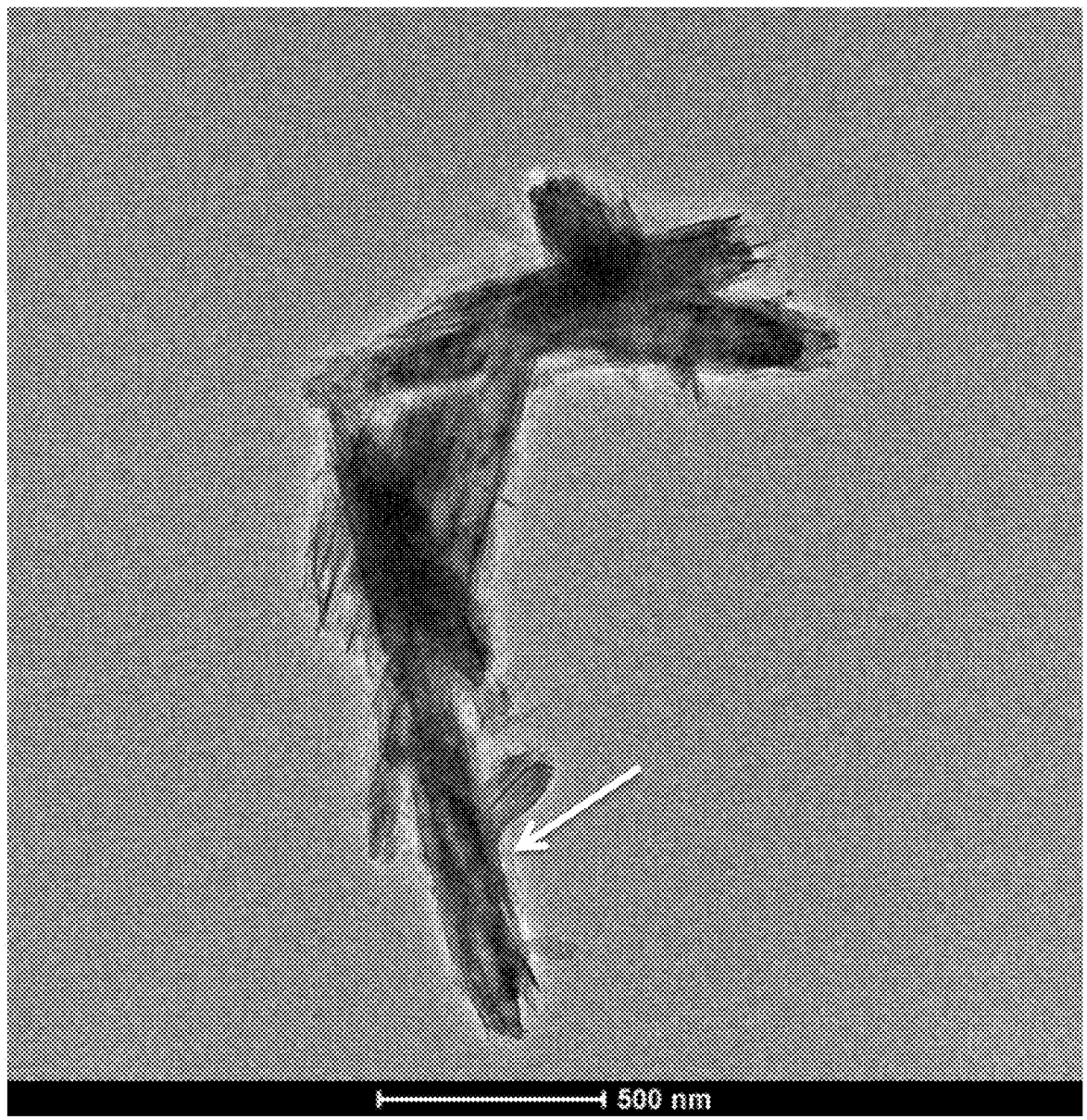
FIG. 13A shows a TEM image of YIOs coated with alumina-needles without ultrasound. The arrow indicates the area of interest.
Figure 13B:
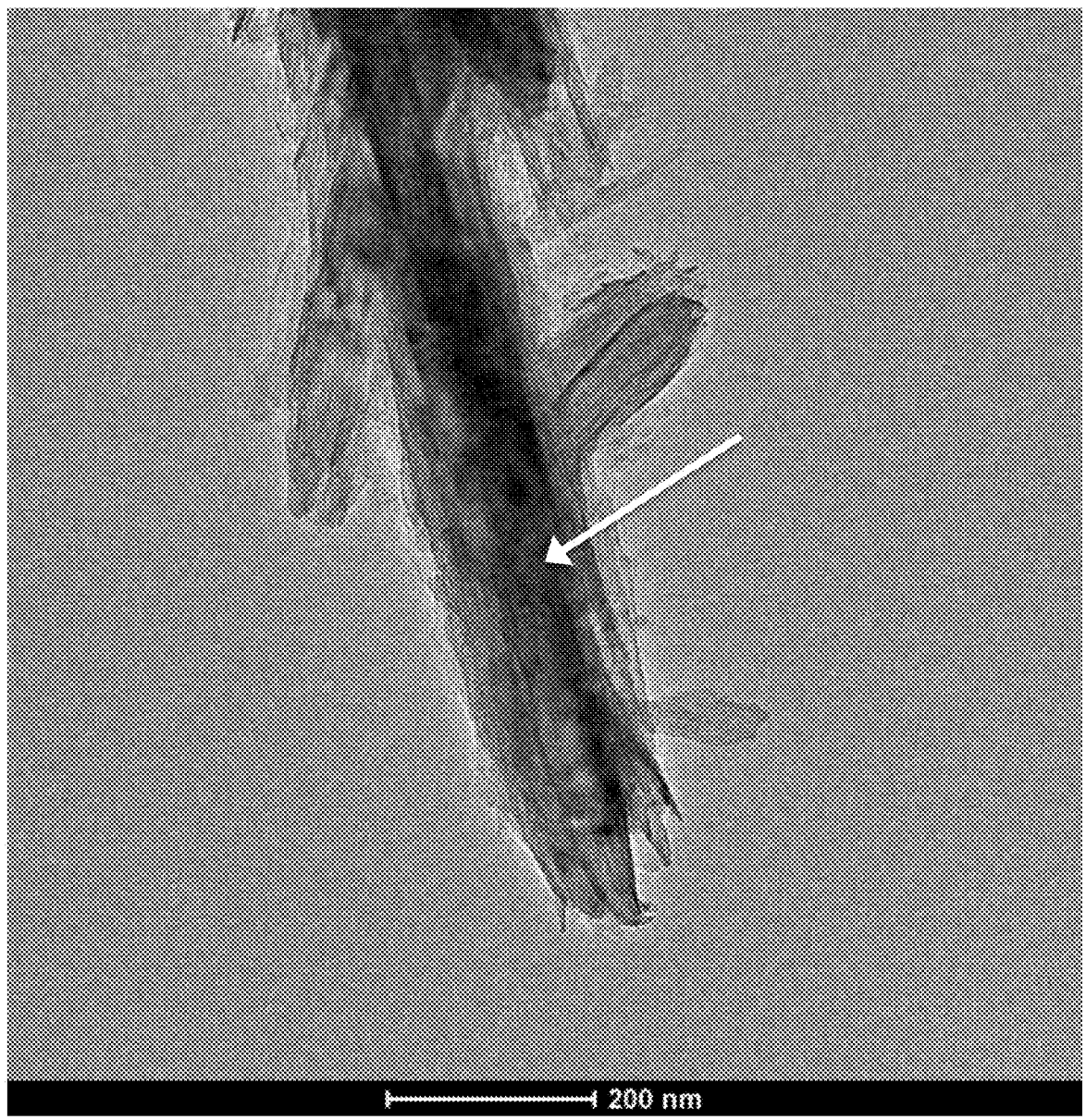
FIG. 13B shows a higher magnification TEM image of YIOs coated with alumina-needles without ultrasound. The arrow indicates the area of interest.
Figure 13C:
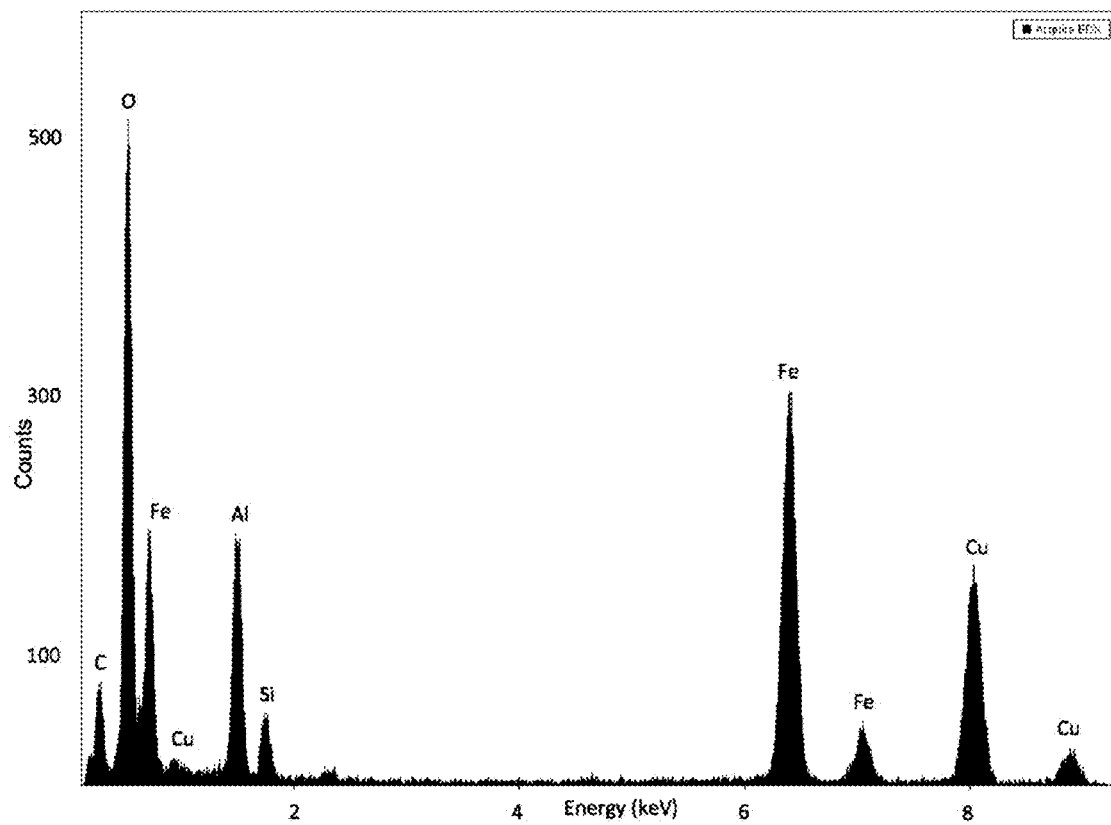
FIG. 13C shows an EDX spectrum of YIOs coated with alumina-needles without ultrasound. The arrow indicates the area of interest.
Figure 14A:
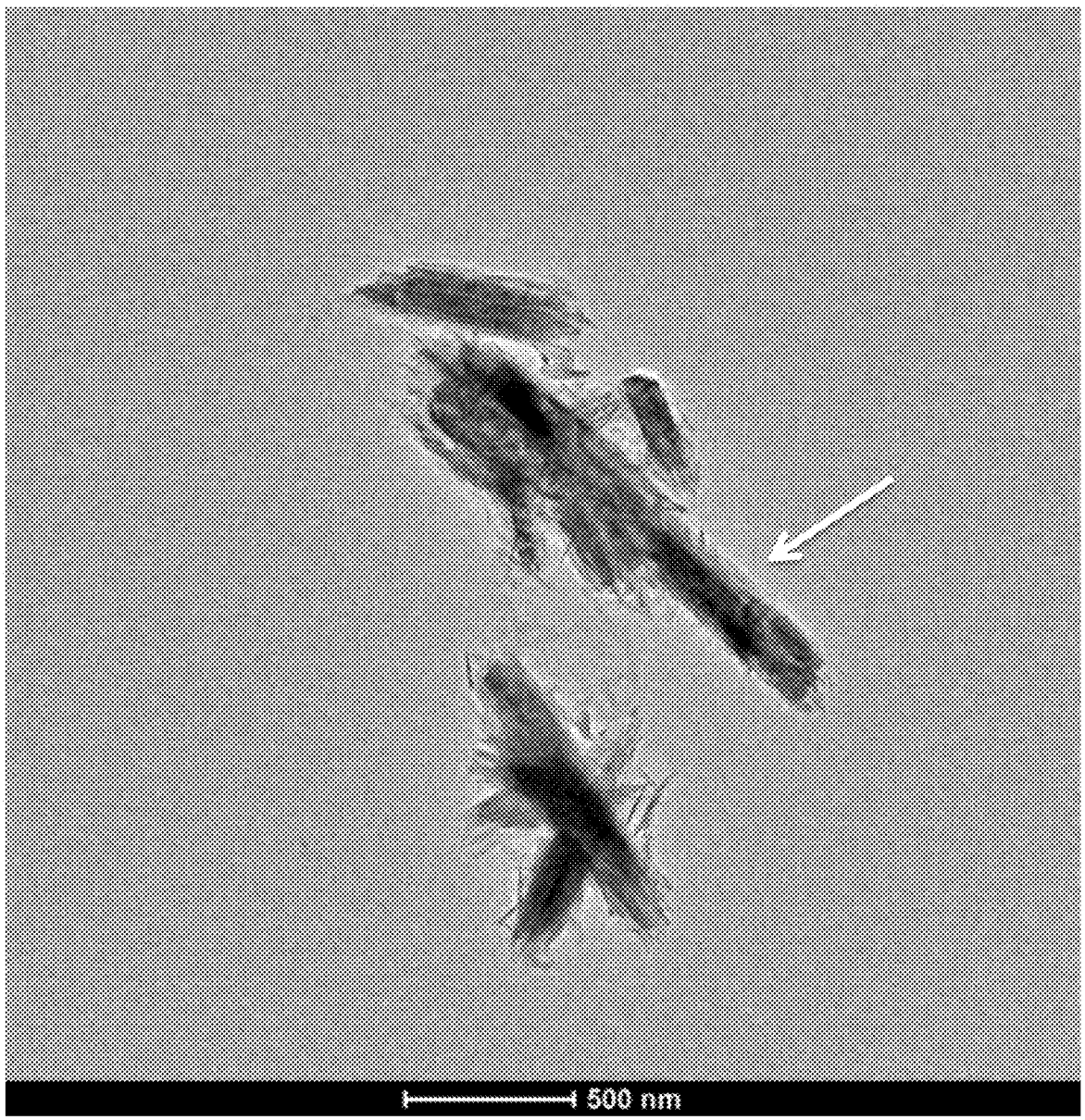
FIG. 14A shows a TEM image of YIOs coated with alumina-needles at 45 kHz ultrasound. The arrow indicates the area of interest.
Figure 14B:
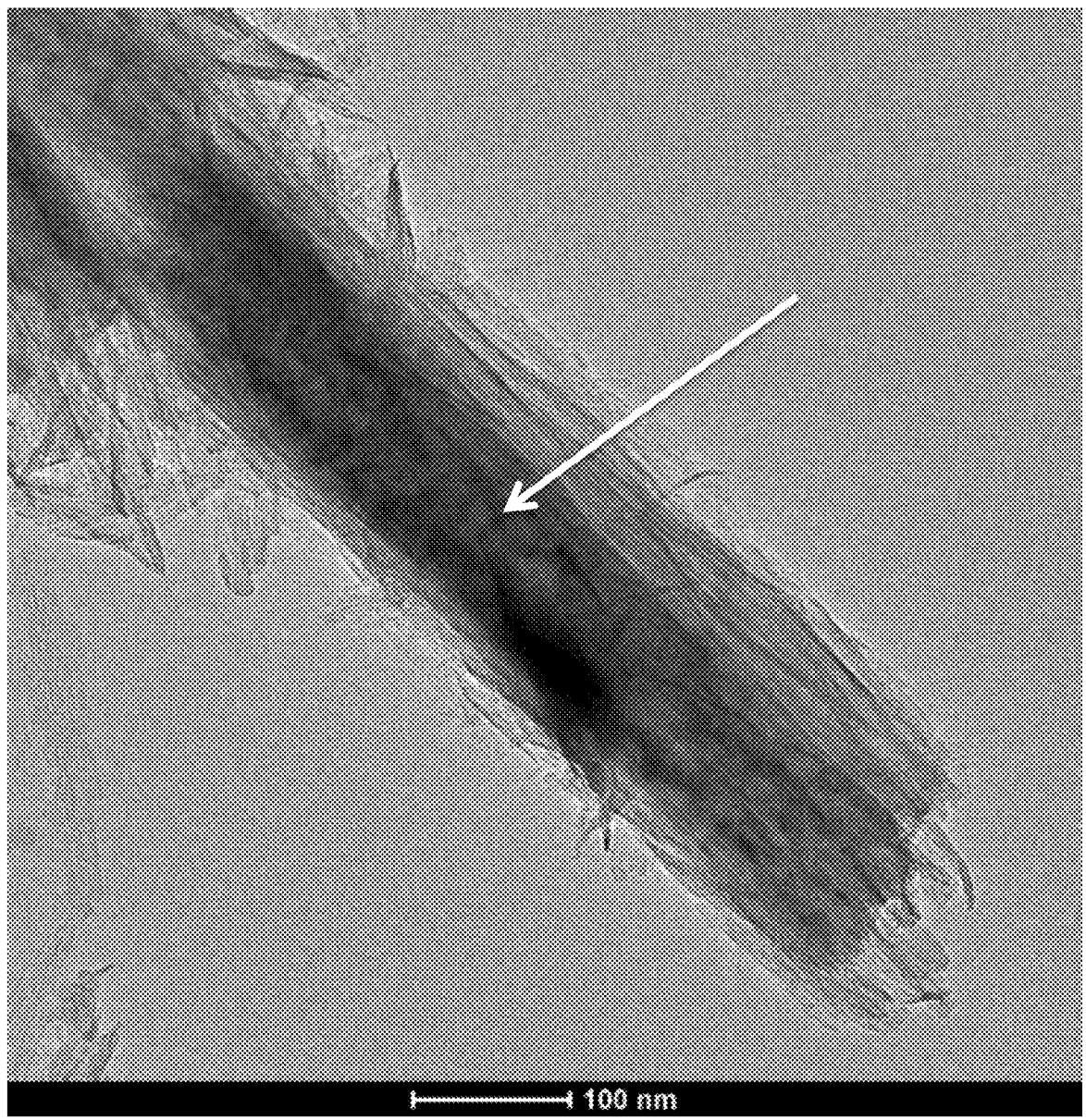
FIG. 14B shows a higher magnification TEM image of YIOs coated with alumina-needles at 45 kHz ultrasound. The arrow indicates the area of interest.
Figure 14C:
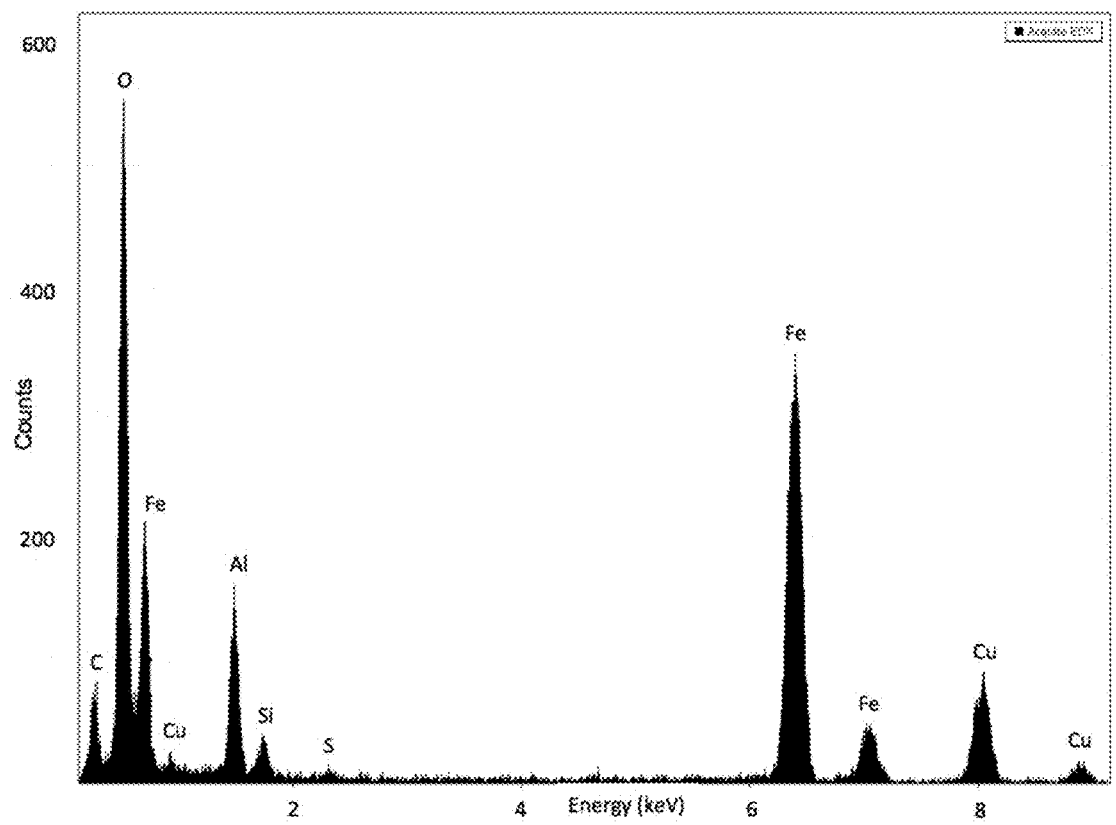
FIG. 14C shows an EDX spectrum of YIOs coated with alumina-needles at 45 kHz ultrasound.
Figure 15:
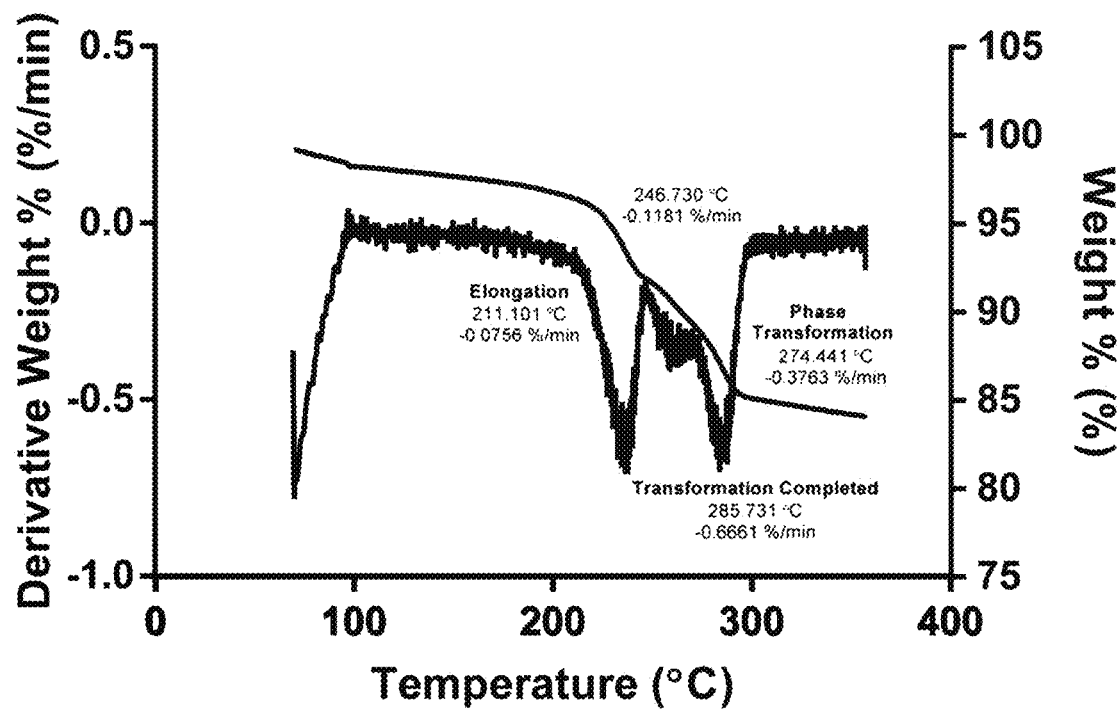
FIG. 15 shows TGA results YIO coated with alumina under sonication at 25 kHz.
Figure 17A:
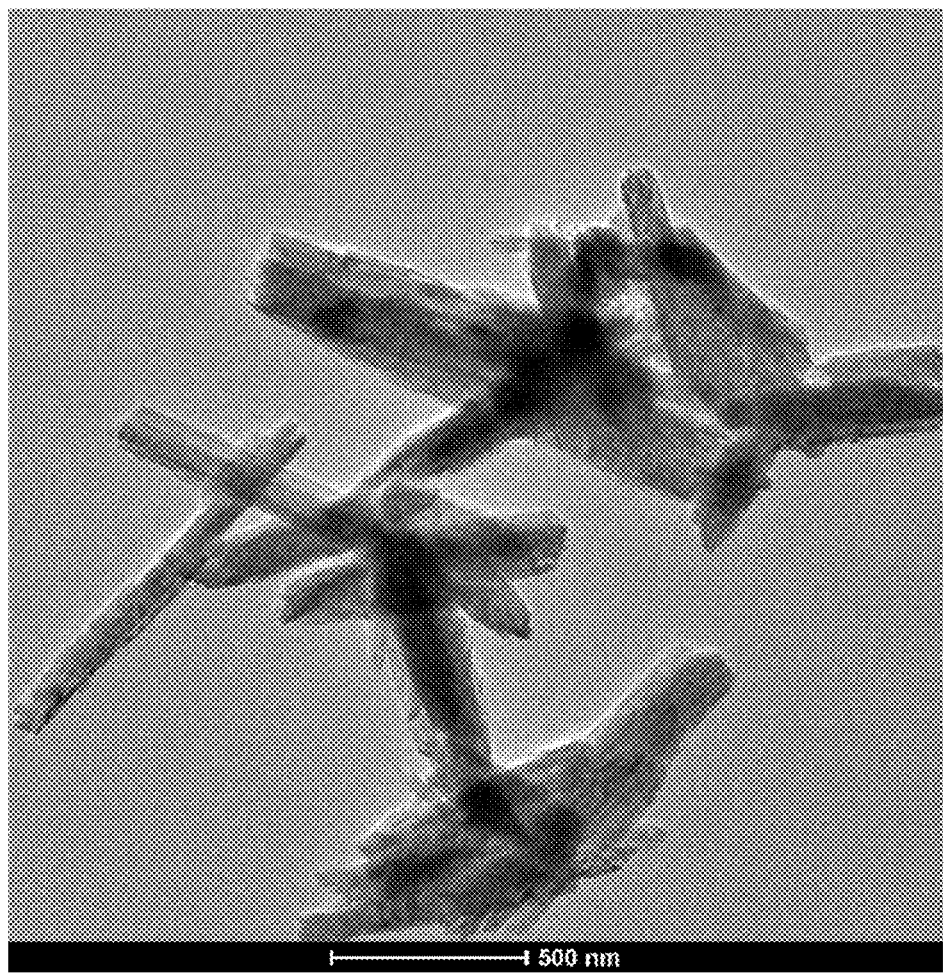
FIG. 17A shows a TEM image at a low magnification, revealing almost no nanofiber coating for frequency of 130 kHz.
Figure 17B:
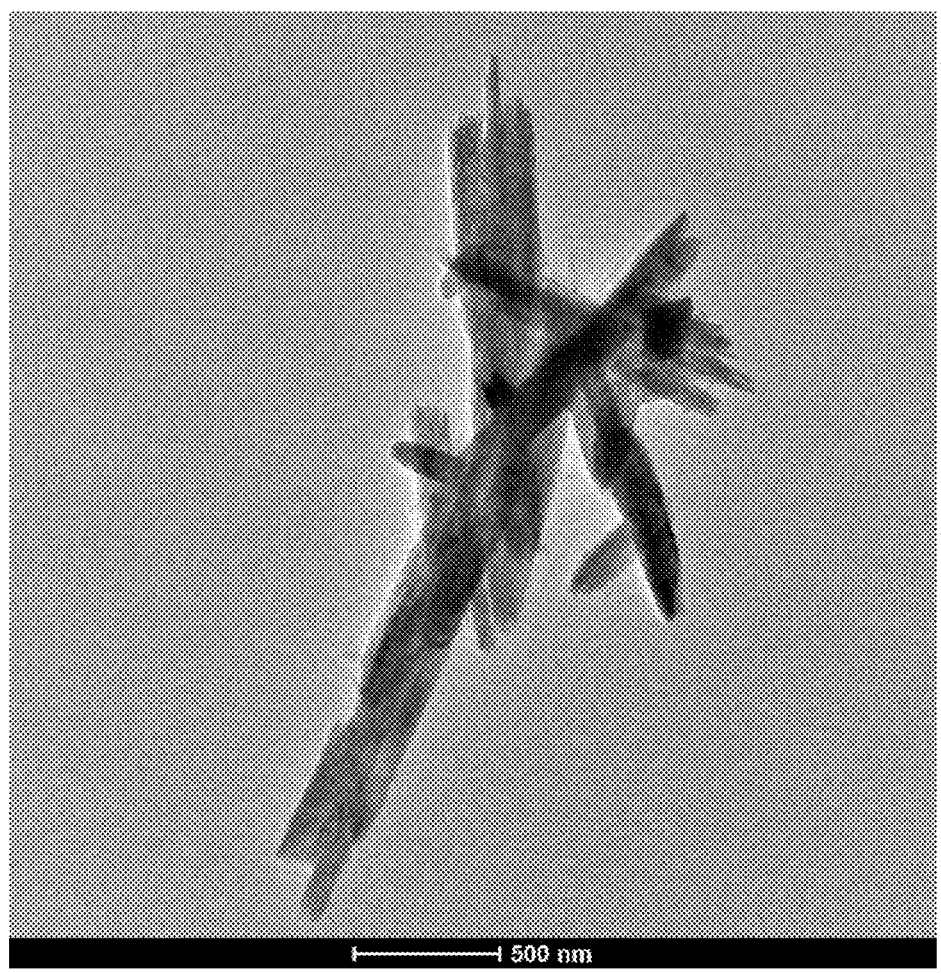
FIG. 17B shows a TEM image at a medium magnification, revealing almost no nanofiber coating for a frequency of 130 kHz.
Figure 17C:
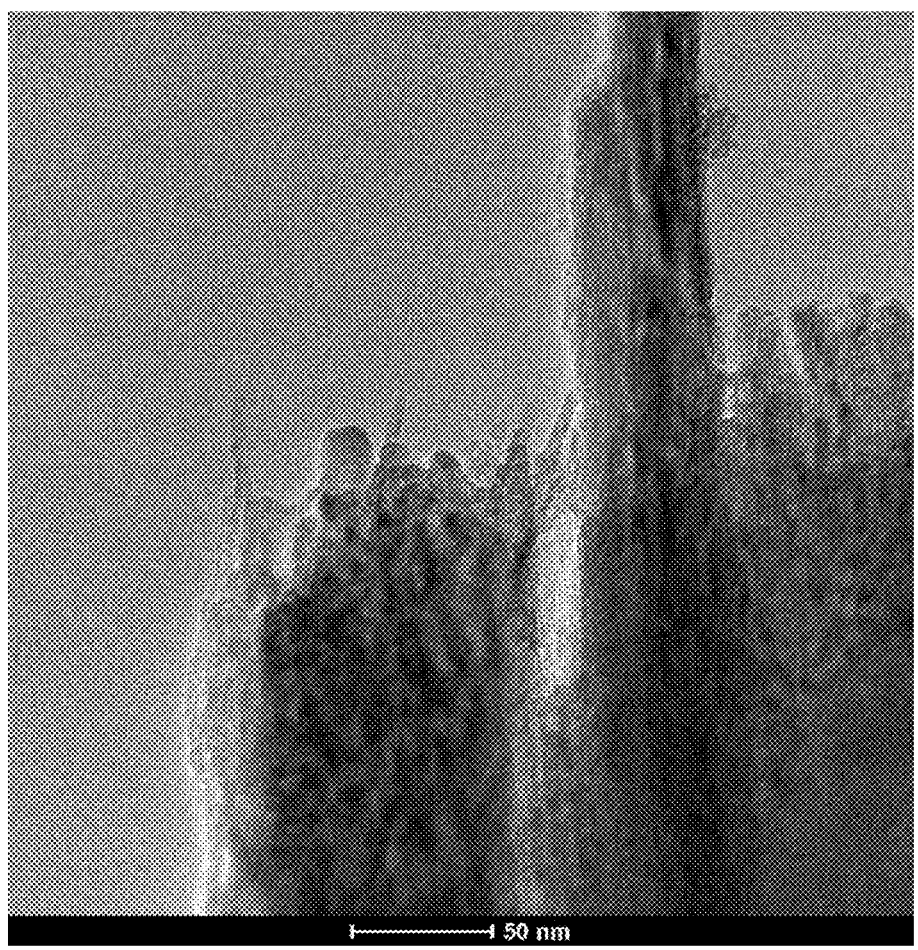
FIG. 17C shows a TEM image at a high magnification, revealing almost no nanofiber coating for a frequency of 130 kHz.
Figure 18A:
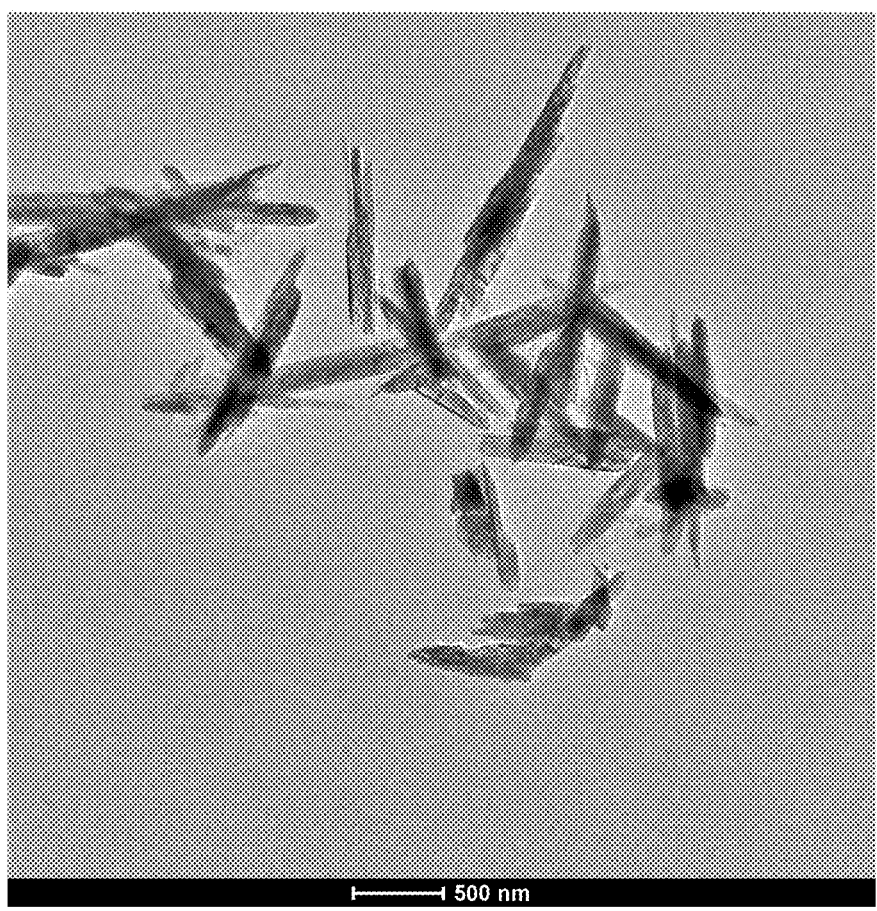
FIG. 18A shows a TEM image at a low magnification, revealing almost no nanofiber coating for a frequency of 35 kHz.
Figure 18B:
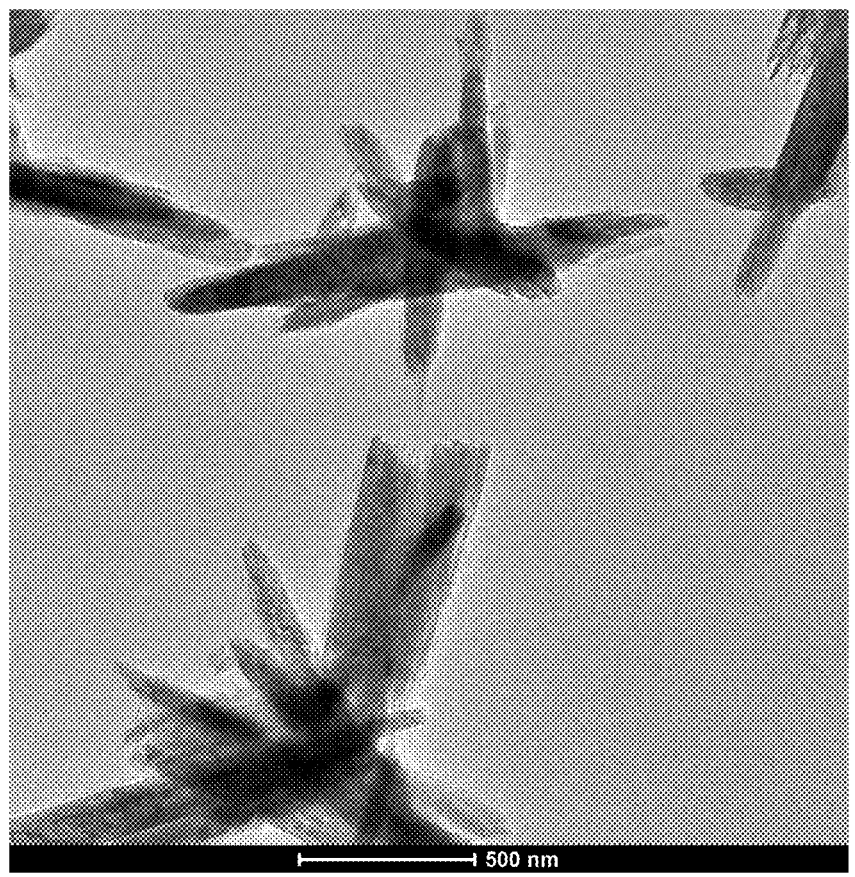
FIG. 18B shows a TEM image at a medium magnification, revealing almost no nanofiber coating for a frequency of 35 kHz.
Figure 18C:
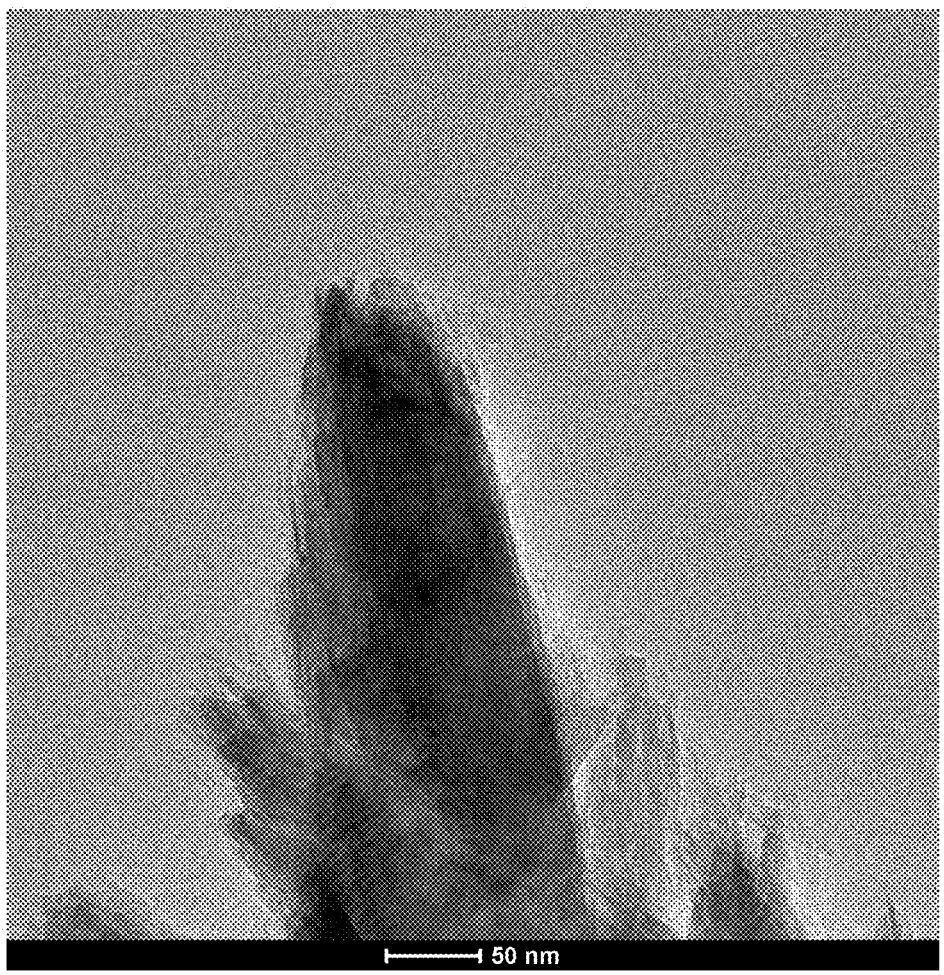
FIG. 18C shows a TEM image at a high magnification, revealing almost no nanofiber coating for a frequency of 35 kHz.
Figure 19A:
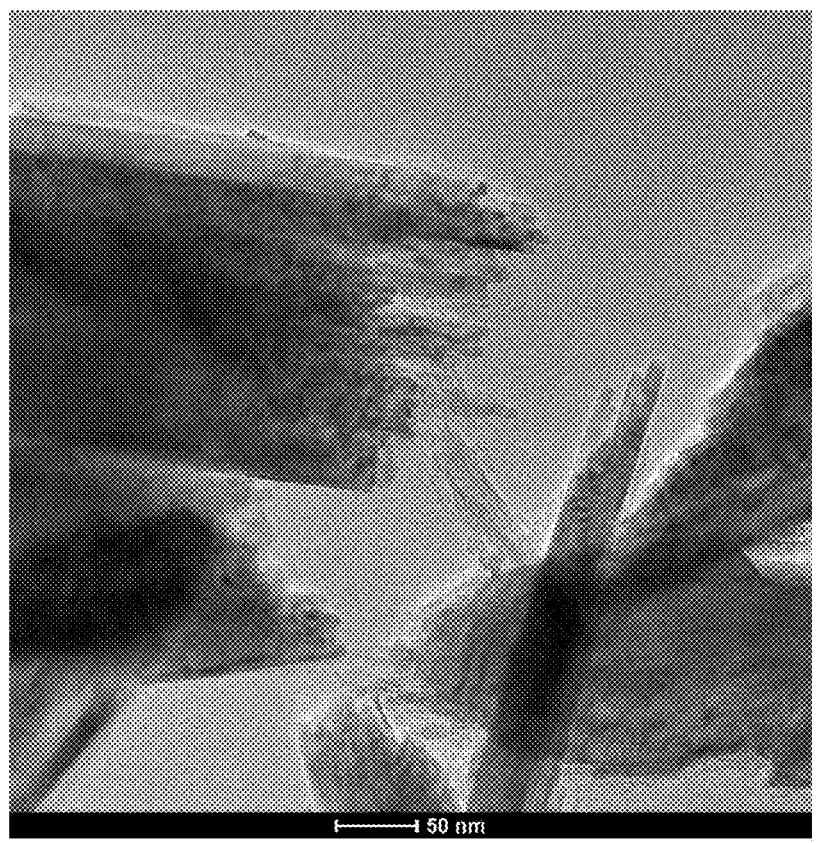
FIG. 19A shows a TEM image of typical alumina-coated YIO at 130 kHz.
Figure 19B:
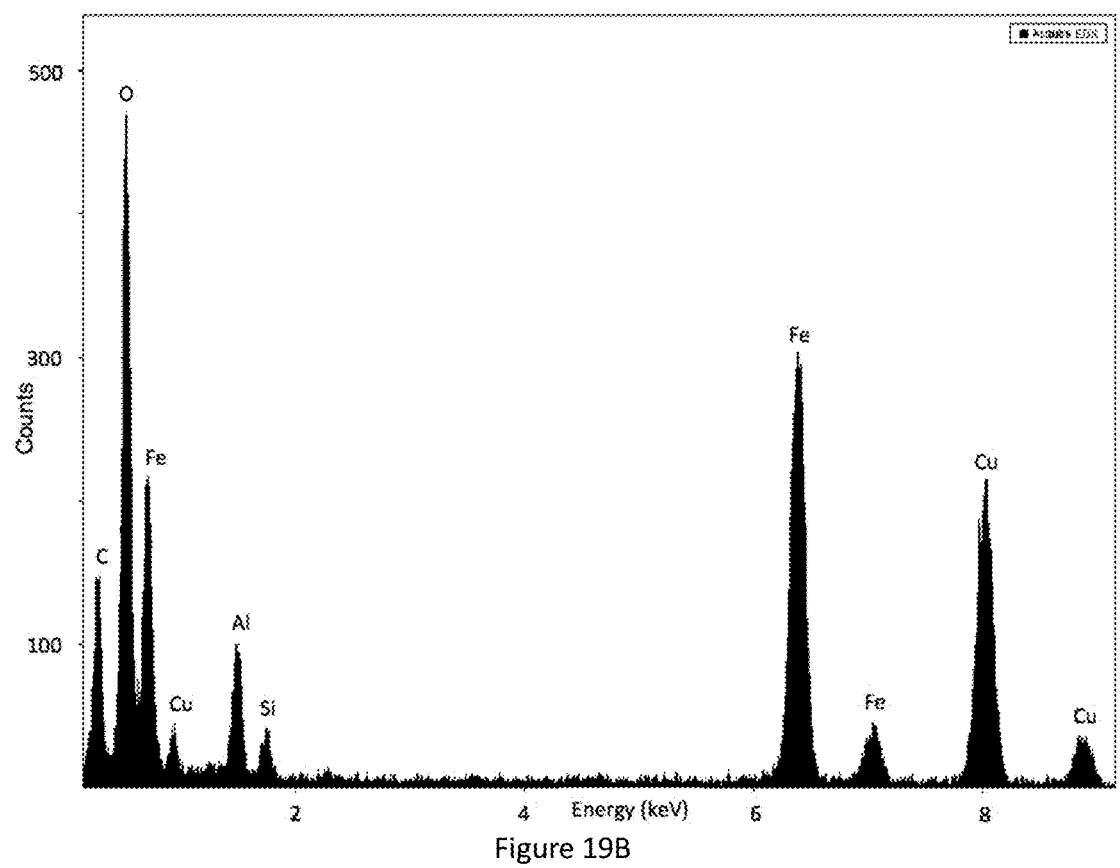
FIG. 19B shows an EDX result for the corresponding alumina-coated YIO at 130 kHz.
Figure 20A:
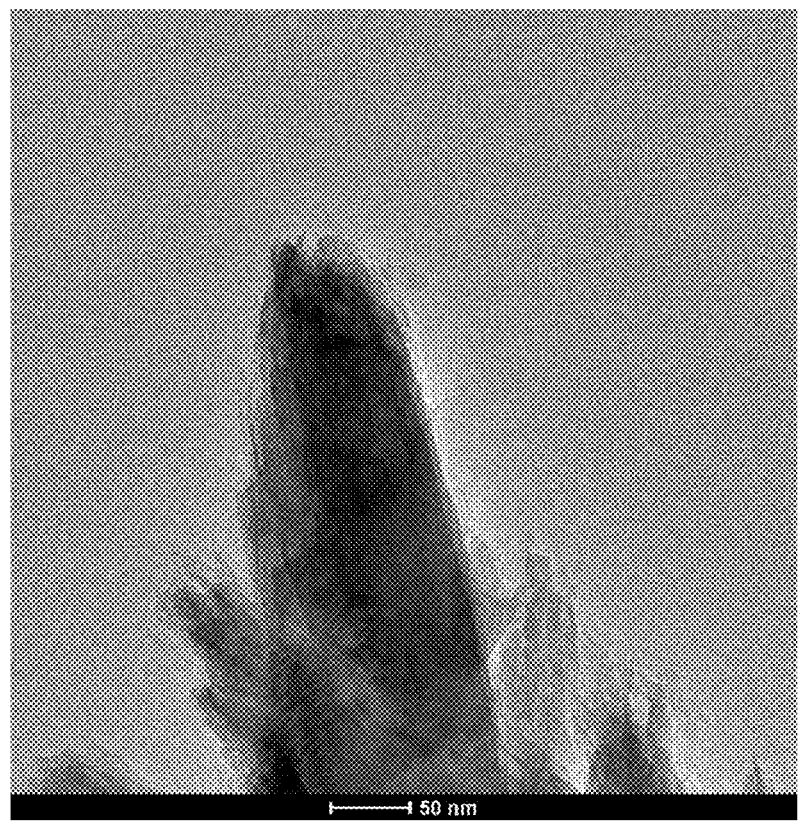
FIG. 20A shows a TEM image of typical alumina-coated YIO at 35 kHz.
Figure 20B:
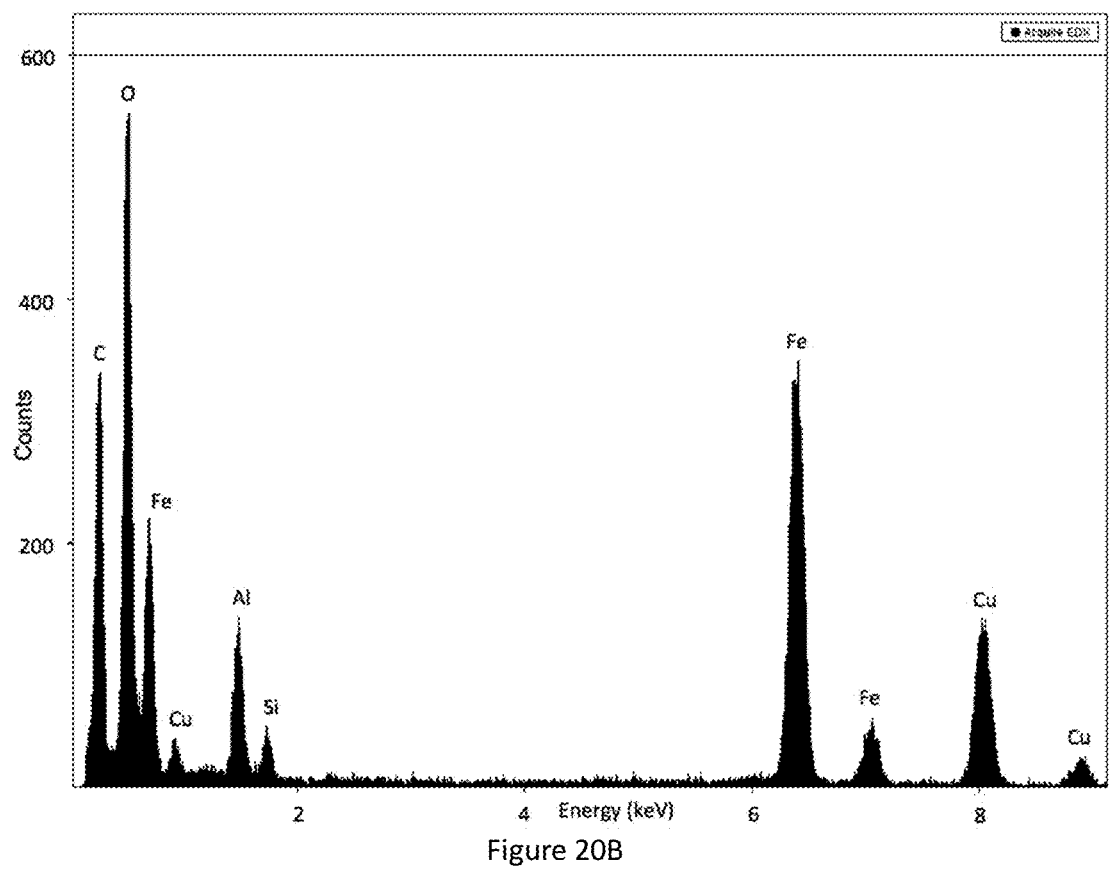
FIG. 20B shows an EDX result for the corresponding alumina-coated YIO at 35 kHz.

Ultrasound frequency resonance with yellow iron oxide rod length (714.3±137.5 nm) for an ordered coating. While four ultrasound frequencies (130 kHz, 45 kHz, 35 kHz, and 25 kHz) were tested, 45 kHz produces the most satisfactory coating properties (FIGS. 7A-7D; 14A-14C); 130 kHz (FIGS. 17A-17C; 19A-19B), 35 kHz (FIGS. 18A-18C; 20A-20B), and 25 kHz (FIGS. 11A-11C; 12A-12C; 15) show significantly less nanofiber coating (FIG. 8A-8C). The yellow iron oxide coating without ultrasound shows a thin layer of coating but no nanofibers (FIGS. 13A-13C).

The wavelength, $\lambda$, of the ultrasound can be determined by: $\lambda = v/f$, where v is the velocity and f is the frequency of the ultrasound. Table 2 below shows the wavelengths of the ultrasound at the aforementioned frequencies.

TABLE 2

| Wavelengths of treating ultrasound at frequencies where nanofiber coating occurs | | |
|---|---|---|
| Wavelength (nm) | Velocity (m/sec) | Frequency (kHz) |
| 7622.22 | 343 | 45 |
| 2638.46 | 343 | 130 |
| 9800 | 343 | 35 |
| 13720 | 343 | 25 |

It can further be observed that nanofiber coating occurs at treating ultrasound frequencies where the ultrasound wavelengths are of approximately integral multiples of the yellow iron oxide rod length (714.3±137.5 nm). These may be considered, for the experimental container conditions above, as resonant frequencies for the particular size of the starting material and may be particularly useful for promoting nanostructure coating growth.

Further experimental conditions for this working example are presented in Table 3 and Table 4:

TABLE 3

Experimental condition of coating process

| Experiment No. | $Al_2O_3$ % | $SiO_2$ % | Temperature (° C.) |
|---|---|---|---|
| 1 | 0.1 | — | 60 |
| 2 | 0.3 | — | 60 |
| 3 | 0.5 | — | 60 |
| 4 | 1 | — | 60 |
| 5 | 3 | — | 60 |
| 6 | 5 | — | 60 |
| 7 | 5 | 1 | 60 |
| 8 | 5 | 5 | 60 |
| 9 | 5 | 10 | 60 |
| 10 | 10 | — | 25 |
| 11 | 10 | — | 60 |
| 12 | 10 | — | 80 |

TABLE 4

Experimental condition of aging process

| Experiment No. | Temperature (° C.) | pH | Time |
|---|---|---|---|
| 1 | 60 | 6.0 | 30 mins |
| 2 | 60 | 9.0 | 30 mins |
| 3 | 60 | 6.0 | 1 hour |
| 4 | 90 | 6.0 | 30 mins |

Table 5.

The table shows the quantified color changes of commercially available yellow iron oxide rods (raw material of YS23(R17-068), prior art yellow iron oxide rods with standard alumina coating (standard $Al_2O_3$ coated YS23(R17-066), and yellow iron oxide rods with alumina nanofiber coating under 45 kHz ultrasound according to the present invention (modified $Al_2O_3$ coated YS23(R17-067). All of the samples were tested according to W/B, that is, the mixing method with white and black.

INDUSTRIAL APPLICABILITY

Accordingly, the first objective of the presently claimed invention relates to a method to coat oxide based color pigments with a coating of nano-sized materials of different morphologies in order to enhance the heat-fastness and color performance of said color pigments. In particular, the present invention provides a method to coat oxide-based color pigments with nano-sized coating materials, including but not limited to, alumina and/or silica at different dosage levels, with nanofiber, nanoneedle, nano spike, nanoplate, nanoflower morphology towards enhancing the heat-fastness and color performance to said color pigments for cement coloring, road painting, and other high-performance pigments, etc.

What is claimed is:

1. A method of increasing the thermal stability of iron oxide pigments comprising:
   placing iron oxide pigment in a coating material precursor solution, wherein the coating material precursor solution is a precursor of one or more of aluminum oxide and silicon oxide;
   treating the iron oxide pigment and the coating material precursor solution with ultrasound at a temperature of less than 100° C. to promote nanoparticle formation on the iron oxide pigment; and
   growing a coating from the coating material precursor solution to grow nanoparticles of one or more of the aluminum oxide and the silicon oxide on a surface of the iron oxide pigment such that the resulting iron oxide pigment is thermally stable to a temperature of at least 230° C.;
   wherein the ultrasound treatment occurs at a frequency where the ultrasound wavelength is approximately an integral multiple of a rod length of the iron oxide pigment with one of the treatment frequencies being between approximately 40 and 55 kHz;
   wherein the rod length is 714.3±137.5 nm.

2. The method according to claim 1, wherein the aluminum oxide precursor is an aluminum sulphate.

3. The method according to claim 1, wherein the silicon oxide precursor is tetraethylorthosilicate or aminopropyl triethylsilane.

| Trial/Formula | | Mass Tone | | | | | Tint Tone | | | | Std |
|---|---|---|---|---|---|---|---|---|---|---|---|
| | | dE | dL | da | db | Strength % | dE | dL | da | db | Strength % | |
| 1. Color |
| Standard $Al_2O_3$ coated YS23(R17-066) | | 4.7 | 1.43 | 0.78 | 4.41 | 105.82 | 3.99 | 3.27 | −1.25 | −1.92 | 74.24 | Raw material of YS23 (R17-068) |
| Modified $Al_2O_3$ coated YS23(R17-067) | | 4.23 | 1.41 | 0.74 | 3.92 | 104.07 | 3.82 | 3.18 | −1.16 | −1.79 | 75.04 | |
| 2. Heat stability02.3 + 0 |
| Standard $Al_2O_3$ coated YS23(R17-066) | 220° C. 30 min | 2.41 | −1.51 | 0.56 | −1.79 | 103.93 | 1.48 | −0.87 | 0.52 | −1.08 | 102.18 | R17-066 |
| | 240° C. 30 min | 3.81 | −2.33 | 0.86 | −2.88 | 106.07 | 2.22 | −1.5 | 0.93 | −1.35 | 105.85 | |
| Modified $Al_2O_3$ coated YS23(R17-067) | 220° C. 30 min | 1.73 | −1.18 | 0.47 | −1.18 | 103.87 | 1.09 | −0.73 | 0.4 | −0.7 | 102.63 | R17-067 |
| | 240° C. 30 min | 3.13 | −1.99 | 0.72 | −2.31 | 105.68 | 2 | −1.32 | 0.63 | −1.36 | 104.56 | |
| Raw material of YS23(R17-068) | 220° C. 30 min | 6.24 | −3.63 | 1.38 | −4.88 | 108.2 | 4.22 | −2.67 | 1.57 | −2.87 | 108.68 | R17-068 |
| | 240° C. 30 min | 11.76 | −6.77 | 2.77 | −9.21 | 116.28 | 8.4 | −5.34 | 3.26 | −5.6 | 119.22 | |

4. The method according to claim 1, wherein the iron oxide pigment is FeOOH yellow iron oxide.

5. The method according to claim 1, wherein the nanoparticles are selected from nanofiber or nanoneedle.

6. The method according to claim 1, wherein the ultrasound treatment is applied for a period of approximately 5 minutes to 120 minutes.

7. The method according to claim 1, wherein the temperature during ultrasound treatment is approximately 40-80° C.

8. The method according to claim 1, wherein the pH during the ultrasound treatment is controlled to between approximately 7-8.

9. The method according to claim 1, wherein the ultrasound-treated material is aged for a period of between approximately 5 minutes and approximately 240 minutes.

10. The method according to claim 1, wherein the ultrasound treatment occurs at 45 kHz.

11. The method according to claim 1, wherein the ultrasound treatment occurs at a frequency where the ultrasound wavelength is approximately an integral multiple of a rod length of the iron oxide pigment.

* * * * *